United States Patent [19]

Foster, Jr. et al.

[11] Patent Number: 6,016,313

[45] Date of Patent: Jan. 18, 2000

[54] SYSTEM AND METHOD FOR BROADBAND MILLIMETER WAVE DATA COMMUNICATION

[75] Inventors: Robert B. Foster, Jr.; Charles R. Baugh; David C. Schafer, all of Bellevue, Wash.

[73] Assignee: WAVTrace, Inc., Bellevue, Wash.

[21] Appl. No.: 08/740,332

[22] Filed: Nov. 7, 1996

[51] Int. Cl.[7] .................................................. H04J 4/00
[52] U.S. Cl. ..................... 370/330; 370/337; 370/338; 455/562
[58] Field of Search .................................... 370/310, 328, 370/329, 336, 337, 338, 345, 347, 315, 319, 321, 323, 325, 326, 330, 343; 455/277.1, 277.2, 272, 278.1, 65, 63, 62, 501, 557, 562

[56] References Cited

U.S. PATENT DOCUMENTS

| | | | |
|---|---|---|---|
| 4,633,463 | 12/1986 | Mack | 370/95 |
| 4,697,281 | 9/1987 | O'Sullivan | 379/59 |
| 4,747,160 | 5/1988 | Bossard | 455/33 |
| 5,095,535 | 3/1992 | Freeburg | 455/278.1 |
| 5,195,091 | 3/1993 | Farwell et al. | 370/94 |
| 5,245,610 | 9/1993 | Lindell | 370/95 |
| 5,295,178 | 3/1994 | Nickel et al. | 379/58 |
| 5,355,520 | 10/1994 | Freeburg et al. | 455/507 |
| 5,437,057 | 7/1995 | Richley et al. | 455/41 |
| 5,488,737 | 1/1996 | Harbin et al. | 455/562 |
| 5,509,028 | 4/1996 | Marque-Pucheu | 375/211 |
| 5,548,814 | 8/1996 | Lorang et al. | 455/38.1 |
| 5,557,656 | 9/1996 | Ray et al. | 379/59 |
| 5,561,850 | 10/1996 | Makitalo et al. | 455/506 |
| 5,564,121 | 10/1996 | Chow et al. | 455/53 |
| 5,677,928 | 10/1997 | Rizzo et al. | 375/202 |

FOREIGN PATENT DOCUMENTS

| | | |
|---|---|---|
| 0332825 | 1/1989 | European Pat. Off. . |
| 0458158 | 5/1991 | European Pat. Off. . |
| 0720405 | 12/1995 | European Pat. Off. . |
| 0731620 | 1/1996 | European Pat. Off. . |
| 9213398 | 8/1992 | WIPO . |
| 9517724 | 6/1995 | WIPO . |

OTHER PUBLICATIONS

"DMS Series (Digital Multipoint System) Next Generation Broadband Flexible Radio Access Network;" Bosch Telecom Microwave Systems Product Group, Backnang, Germany.
"DMS Series Broadband Access Radio System."
"Antenna Solutions for Point–to–Multipoint Radio Systems;" H. Ansorge, M. Guttenberger, K.H. Mierzwiak, U. Oehler, H. Tell; Bosch Telecom GmbH, D–71522 Backnang.
"Dynamic Bandwidth Allocation for FDMA Systems;" Dr. Erich Auer; Bosch Telecom D–71522 Backnang, Germany.
"Link Capacity and Cellular Planning Aspects for a Point to Multipoint Fixed Radio Access System;" A. Bollmann, D. Cichon, M. Glauner; Bosch Telecom GmbH, D–71522 Backnang, Germany; IHE, Universität Karlsruhe (TH), D–76128 Karlsruhe, Germany.
"DMS Series Digital Multipoint System Fixed Radio Access Systems, Systems Description;" Issue 3, Nov. 1995; Dr. Hans–Peter Perry; Bosch Telecom Microwave Systems Division Backnang, Germany.

*Primary Examiner*—Chi H. Pham
*Assistant Examiner*—Kwang B. Yao
*Attorney, Agent, or Firm*—Fulbright & Jaworski L.L.P.

[57] ABSTRACT

A system and method for information communication between physically separated processor-based systems. Disclosed is a centralized communication array providing point to multipoint information communication between processor-based systems utilizing communication nodes. Such information communication may be between two processor-based systems, each utilizing communication nodes or may be between a processor-based system utilizing a communication node and a processor-based system coupled to the centralized communication array through a backbone.

86 Claims, 6 Drawing Sheets

SYSTEM AND METHOD FOR BROADBAND MILLIMETER WAVE DATA COMMUNICATION

TECHNICAL FIELD OF THE INVENTION

This invention relates to broadband radio frequency communication systems and methods and more particularly to a system and method which provides for broadband information communication between processor-based systems through a centralized communication array.

BACKGROUND OF THE INVENTION

In the past, information communication between processor-based systems, such as local area networks (LAN) and other general purpose computers, separated by significant physical distances has been an obstacle to integration of such systems. The choices available to bridge the physical gap between such systems have not only been limited, but have required undesirable tradeoffs in cost, performance, and reliability.

One group of historically available communication choices includes such solutions as the utilization of a standard public switch telephone network (PSTN) or multiplexing signals over a existing physical link to bridge the gap and provide information communication between the systems. Although such solutions are typically inexpensive to implement, they include numerous undesirable traits. Specifically, since these existing links are typically not designed for high speed data communication, they lack the bandwidth through which to communicate large amounts of data rapidly. As in-building LAN speeds increase to 100 Mbps, the local PSTN voice grade circuits even more markedly represent a choke point for broadband metropolitan area access and therefore are becoming a less and less desirable alternative. Furthermore, such connections lack the fault tolerance or reliability found in systems designed for reliable transmission of important processor-based system information.

Another historically available group of communication choices is found at the opposite end of the price spectrum than those mentioned above. This group includes such solutions as the utilization of a fibre optic ring or point to point microwave communication. These solutions are typically cost prohibitive for all but the larger users. The point to point systems require a dedicated system at each end of the communication link which lacks the ability to spread the cost of such systems over a plurality of users. Eve if these systems were modifiable to be point-to-multipoint, to realize the economy of multiple system use of some system elements, the present point-to-point microwave systems would not provide broadband data services but rather traditional bearer services such as T1 and DS3. Furthermore these systems typically provide a proprietary interface and therefore do not lend themselves to simple interfacing with a variety of general purpose processor-based systems.

Although a fibre optic ring provides economy if utilized by a plurality of systems, it must be physically coupled to such systems. As the cost of purchasing, placing, and maintaining such a ring is great, even the economy of multi-system utilization generally does not overcome the prohibitive cost of implementation .

A need therefore exists in the art of information communication for a communication system providing cost effective bridging of large physical distances between processor-based systems.

A further need exists in the art for a communication system providing high speed broadband information communication between processor-based systems.

A still further need exists in the art for a fault tolerant communication system providing reliable bridging of physical gaps between processor-based systems.

Additionally, a need exists in the art for a broadband communication system providing simple connectivity to a variety of processor-based systems and communication protocols, including general purpose computer systems and their standard communication protocols.

SUMMARY OF THE INVENTION

These and other objects, needs and desires are obtained in a system and method of communication in which a communication array, or hub, is centrally located to provide a air link between physically separated processor-based systems, or other sources of communication such as voice communication, utilizing a communication device, or node, of the present invention. Preferably, this central array may be physically coupled to an information communication backbone providing communication between air linked systems and physically linked systems. Furthermore, multiple ones of such system may be utilized to bridge large physical separation of systems by the intercommunication of multiple central arrays. Moreover, pervasive surface coverage may be provided by arranging a plurality of such communication arrays to provide a cellular like overlay pattern.

In a preferred embodiment, the central communication array comprises a plurality of individual antenna elements in time division multiplex (TDM) communication with a processor-based system. This system processes signals received at each antenna element in order to route them to their desired destination. A advantage of using a plurality of individual antenna elements at the central communication array is that only antenna elements having a radiation pattern overlaying a remote site requiring communication service (subscriber) need be implemented at any particular time. Thereafter, as more subscribers require service by a particular hub, additional antenna elements may be installed. This modular expansion of the service capabilities of a hub results in reduced initial installation costs where only a few subscribers initially require service, while maintaining the flexibility for implementation of omni directional and/or cellular overlay communication coverage not possible with point-to-point systems.

Also in a preferred embodiment, the communication spectrum utilized by the communication system is frequency division multiplexed (FDM) to provide multiple channels for simultaneous information communication to a plurality of subscribers. I addition to simultaneous information communication to the subscribers, FDM channels may also be used to communicate control information through a predetermined band to network elements simultaneously with the transmission of other data.

Preferably a carrier frequency in the millimeter wavelength spectrum, such as 10 to 60 GHz, is used by the present invention. Such carrier frequencies are desirable in order to provide a communication bandwidth sufficient for the transmission of at least 30 Mbps through each defined FDM channel of approximately 10 MHz.

The FDM channels may provide full duplex by defining a transmit (Tx) and receive (Rx) channel pair as a single frequency division duplex (FDD) channel to serve a subscriber. However, it shall be appreciated that the provision of full duplex by FDD is at the expense of depletion of the available spectrum at a increased rate as service to a single subscriber actually requires two channels.

In addition to multiplexing communication of frequency divided channels, time division multiplexing may be utilized to provide multiple, seemingly simultaneous, communications on a single FDM channel. Here ones of the FDM channels are broke down into a predetermined number of discrete time slices (burst periods) which form a frame. Each burst period may be utilized by a different subscriber so as to result in information communication contained in a single frame, having a number of TDM bursts, being directed to/from a number of subscribers over a single FDM channel.

Moreover, full duplexing may be synthesized on a single FDM channel by time division duplexing (TDD) through the use of burst periods like those used in TDM. Through TDD, Tx and Rx frames, each frame having one or more burst periods, are defined to provide communication in a particular direction at a predefined time.

It shall be appreciated any of the aforementioned FDM, FDD, TDM, and TDD schemes, or their like, may be utilized in any combination deemed advantageous. For example, a single frequency division channel may be time division multiplexed to provide communication to a number of subscribers while simultaneously being time division duplexed to synthesize full duplexed communication with these subscribers.

In the above described embodiments, the communication system may utilize a initialization algorithm, perhaps including a token passing arrangement for shared data users, to poll subscriber's systems and determine communication attributes of each such system at each antenna element of the central array. This information may be utilized to determine the optimum assignment of resources, including antenna elements, TDM burst periods, FDD frequency assignments, and TDD Tx and Rx time assignments for each such system. This information may addition ally be utilized to provide secondary assignment of resources to maintain system integrity in the event of a anomalous occurrence, thereby providing system fault tolerance.

The foregoing has outlined rather broadly the features and technical advantages of the present invention in order that the detailed description of the invention that follows may be better understood. Additional features and advantages of the invention will be described hereinafter, which form the subject of the claims of the invention. It should be appreciated by those skilled in the art that the conception and the specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawings, in which.

DESCRIPTION OF THE PREFERRED EMBODIMENTS

Figure 1:
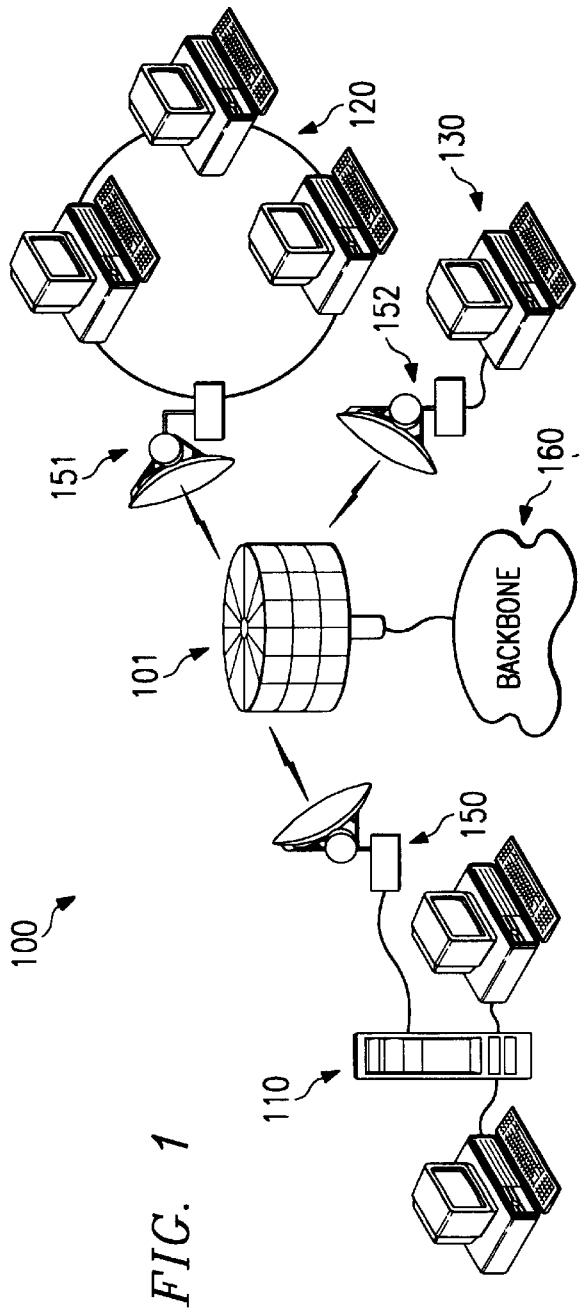
FIG. 1 illustrates the interconnection of processor-based systems of a preferred embodiment of the present invention.

The present invention provides high speed data communication via a broadband air interface allowing data access between subscriber's remotely located systems. Referring to FIG. 1, it can be seen that such wireless communication may be utilized, for example, to provide high speed bridging of a physical gap between a plurality of processor-based systems, as illustrated by system 100. The processor-based systems may include local area networks (LAN), such as LANs 110 and 120, or individual computer systems, such as PC 130. It shall be appreciated that the processor-based systems utilizing the present invention may be general purpose computers, both standing alone and interconnected such as by a LAN. Furthermore, the system can connect other communication systems such as voice or video incombination with, or inplace of, communication sourced by the above mentioned processor-based systems.

Systems bridged by the present invention may utilize a communication device, hereinafter referred to as a "node," for communicating with a centralized communication device also of the present invention, hereinafter referred to as a "hub." Still referring to FIG. 1, a hub is illustrated as element 101 and several nodes are illustrated as elements 150, 151, and 152 connected to LANs 110 and 120 as well as to PC 130.

Also, as illustrated inFIG. 1, such wireless communication may be utilized to provide high speed communication between a processor-based system, having a node coupled thereto, and communication backbone, such as backbone 160, through hub 101. It shall be understood that backbone 160 may be any form of communication means, such as a broadband fibre-optic gateway or other broadband data grade connection, T1 communications lines, a cable communication system, the Internet, or the like, physically connected to hub 101. Moreover, backbones, such as illustrated by backbone 160, may be utilized to interconnect a plurality of hubs into a communications network.

A communication network comprising a plurality of hubs is illustrated inFIG. 6. Through such a network, a node, such as node 150, indirect communication with one hub, such as hub 101, may communicate with a node, such as node 621, indirect communication with another hub, such as hub 620. Such communication may be accomplished through the two hubs interconnection via a backbone, such as backbone 160. Of course, it shall be understood that intercommunication between hubs may be accomplished through information "back-hauling" via air gap communication between two hubs such as is illustrated with hubs 101 and 630. It shall be appreciated that a communications network may include any number of hubs incommunication with other hubs, through such means as air gap or direct backbone interconnection, or the like. Information communicated from a node indirect communication with one hub may be routed through various such interconnections to a node in direct communication with any hub of the communication network.

In a preferred embodiment, the hub of the present invention is an omni directional antenna array having a plurality of individual antenna elements. One such individual antenna element is depicted as antenna element 200 in FIG. 2A. The antenna elements are narrow beam directional antennas having a predetermined communication lobe. These antenna elements are arranged in an array to provide an omni directional composite radiation pattern. However it shall be understood that only the number of antenna elements required to communicate with a predetermined number of remote systems, rather than an omni directional configuration, may be used, if desired.

Preferably, the antenna elements comprising hub 101, such as antenna element 200, provide directional reception of extremely high frequency (EHF), such as that of 38 GHz providing millimeter wave (mmWave) communication in the Q-band. Such frequencies are advantageous as they have small wave lengths which are desirable for communication by highly directional antennas. Moreover, antennas utilized for communication of such frequencies may be physically small while providing large signal gain.

The combination of such highly directional antennas with high gain provides for improved frequency reuse and reduces the likelihood of multi-path interference. Additionally, the large gainrealized by such antennas is necessary to allow for communication over a reasonable distance from the antenna, such as, for example, three (3) miles from point to point while using reasonable power levels.

Furthermore, such frequencies have only recently been licensed by the United States Government for use in radio communications. As such, this frequency range is not currently inpervasive use by other communications technologies. However, it shall be understood that the advantages of the present invention may be realized by the use of any frequency band providing ability to communicate data at high speeds, providing that the selected band yields at least one channel of approximately 10 MHz.

Figure 2B:
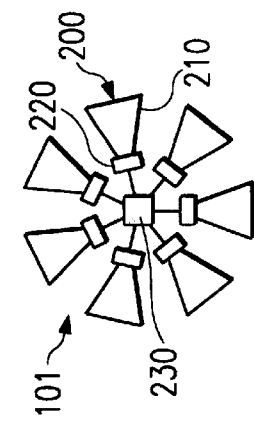
FIG. 2B illustrates a horizontal plane cross section view of the centralized communication array depicted in FIG. 2A.
Figure 2A:
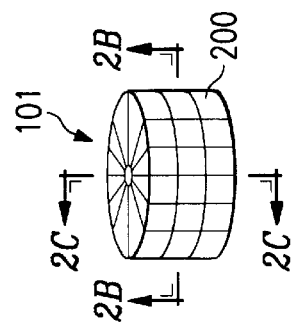
FIG. 2A illustrates a isometric view of the centralized communication array of a preferred embodiment of the present invention.

In the preferred embodiment, where omni-directional coverage by hub 101 is to be utilized, individual antenna elements are arranged azimuthally, as illustrated in FIG. 2B, to cover a full 360 degree radius in a horizontal plane. It shall be appreciated that arranging antenna elements in this manner can provide blanket radio communication coverage radially about hub 101 by selecting the communication lobe of each antenna element to provide coverage in areas where the neighboring antenna elements are not so providing coverage.

Of course, as discussed above, the addition of antenna elements sufficient in number to provide a full 360 degree radiation pattern may be accomplished modularly as system use demands. It shall be appreciated that, even where ultimately 360 degree coverage is desired, the modular nature of the individual antenna elements provides an economic means by which to provide initially limited coverage to a developing area. For example, where only a few locations, or subscribers, within a geographic area covered by a particular hub site are desirous of communications by the present invention, a hub, including only those antenna elements necessary to service these subscribers, may be erected. Thereafter, as additional subscribers desire service within the service area of the hub, additional antenna elements may be added to the hub to provide service to their associated nodes. Ultimately the hub may be filled out with individual antenna elements to achieve communications in a full 360 degree radius about the hub.

Provision of a hub of the present invention which may be expanded to include additional antenna elements may be accomplished in a number of ways. For example, a hub frame adapted to accept individual antenna elements at predetermined positions may be initially erected. Thereafter, individual antenna elements may be coupled to this hub frame inpositions corresponding to areas requiring service or increased service density.

Similarly, a hub mast and platter, or other support structure, may be initially erected. As areas serviced by the hub require service or increased service density, individual antenna element structures could be added to the hub support structure. In this embodiment, each antenna element includes its own support and mounting structure to couple it to the hub support structure and any neighboring antenna element structures. It shall be appreciated that such a embodiment provides for reduced startup cost where only a few antenna elements are required to initially service the area. Furthermore, such an embodiment provides for more flexibility in positioning individual antenna elements as the antenna elements are not limited to positioning dictated by a preexisting frame structure.

Preferably, a total of 22 individual antenna elements, having a communication lobe with approximately a 16 degree azimuthal beam width and a 2.5 degree elevational beam height, are utilized to accomplish 360 degree communication about hub 101. However, any number of individual elements could be utilized depending on individual design constraints, such as the presence of reflected waves and their associated multipath interference. Additionally, as discussed above, only the number of antenna elements needed for communication with certain identified nodes 150 may be used if desired.

Experimentation has revealed that the use of antenna elements with a 16 degree azimuthal beam width is advantageous inproviding a desirable reuse of channels, both at the hub and in a cellular overlay pattern providing channel reuse of the various hubs. For example, an antenna element operating in the mmWave spectrum, configured as described above to have approximately a 16 degree beam, has been found to have side lobe characteristics to permit reuse of the same channel at an antenna element located on the same hub displaced approximately 90 degrees radially.

Still referring to FIG. 2B, it can be seen that each antenna element 200 of the preferred embodiment is comprised of horn 210 and module 220. I the preferred embodiment, where EHF is used, horn 210 is a hybrid mode lens corrected horn providing approximately 32 dB of gain. Module 220 is a synthesized mmWave front-end module accepting and transmitting 38 GHz radio frequency energy through horn 210 converted to/from an intermediate frequency (IF), such as in the range of 400–500 MHz, for communication with a modem, such as modem 240 illustrated in FIG. 2C. Of course, depending on the carrier frequency used, the components of the antenna elements may be different than that stated above. Likewise, the horn and module attributes of the antenna elements may be different than that stated above where, for example, a different carrier frequency or beam pattern is desired.

Preferably, modem 240 is a wideband modem capable of 42 Mbps throughput using quadrature amplitude modulation (QAM). As will be discussed hereinafter, the system may utilize a variable rate modem, such as is available commercially from various manufacturers including BroadCom Corporation, Philips, and VLSI Technology. Such a variable rate modem provides for the transmission of variable information densities (i.e., various numbers of bits per symbol), for example from 17 to 51 Mbps (corresponding to 4 QAM, encoding two bits per symbol, up to 256 QAM, encoding 8 bits per symbol), at a fixed baud rate, such as 8.5 Mbaud. Typically such a modem utilizes matched data filtering that results in an occupied RF bandwidth that is 15% to 30% in excess of the theoretical Nyquist bandwidth. The variable modem ca be useful in increasing spectral efficiency by changing the density of the information communicated to the served users depending o communication attributes such as their relative distance from the hub.

For example, a increased density of data in a particular time frame may be communicated to a node, geographically positioned near a hub, by the use of 256 QAM using the same occupied RF bandwidth and substantially the same transmitter power as the transmission of a signal containing a decreased density of data to a node, geographically positioned on the fringe of the hub's radiation pattern, by the use of 4 QAM. The transmission of increased data density to the near node without the need for significantly increased power is achievable in part because of lessened effects of signal attenuation, and thus a higher signal to noise ratio associated with a give power level, for the near node as compared to the far node. The higher signal to noise ration experienced at the near node can typically sustain increased information density. However, regardless of the transmission density ultimately settled upon, when using a variable rate modem it may be advantageous to initially synchronize the system using lower order modulation and subsequently switch to higher order modulation for a give node.

Link management information, such as control signals adjusting the aforementioned information density, and/or error correction information may be multiplexed as control information into the data stream communicated by the modem. For example, the control information may include multiplexed filtering and error correction information, such as forward error correction (FEC) data embedded in the data stream. Of course, any number of methods of providing link management and error detection/correction may be provided through the use of information multiplexed through a data stream communicated by a modem of the present invention.

Figure 2C:
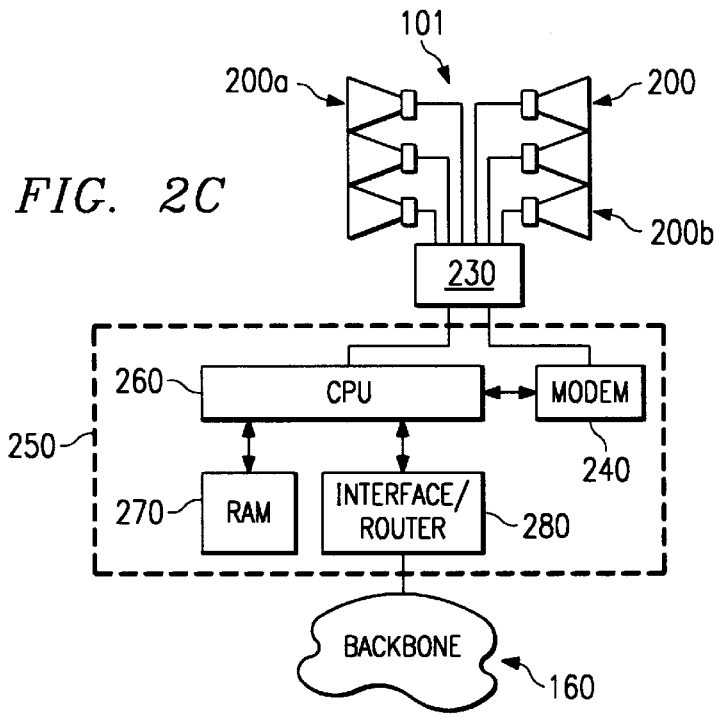
FIG. 2C illustrates a vertical plane cross section view of the centralized communication array depicted in FIG. 2A.

In a preferred embodiment, the individual antenna elements are arranged in a number of tiers. These tiers may simply be a identified group of antenna elements, or may be a physically delineated arrangement of antenna elements. Regardless of their physical interrelation ship, a tier of antenna elements includes any number of antenna elements having substantially non-overlapping radiation patterns. Illustrated in FIG. 2C is one embodiment including three vertical tiers of antenna elements. Each tier of hub 101 is preferably disposed to provide substantially the same far field radiation pattern. However, antenna elements of different tiers are preferably adapted to provide simultaneous communication on a channel, or channels, different than antenna elements having overlapping radiation patterns. For example an antenna element from a first tier may communicate through the use of a first frequency band while an antenna element from a second tier communicates through the use of a second frequency band. Similarly, the antenna element from the first tier may, although utilizing a same set of channels as an antenna element of the second tier, communicate through one particular channel of the set while the antenna element of the second tier communicates through a different channel. The use of these different frequencies provides a convenient means by which additional communication capacity may be served in a defined geographic area.

Of course, the hub is fully scalable and may include a number of tiers, different than that illustrated. Any number of tiers, including any number of antenna elements, may be utilized by the present invention. For example, a single tier of antenna elements may be used to provide omnindirectional communication from hub 101 where increased communication density is not required. Similarly, two tiers, each including only a single antenna element, may be used to provide increased capacity in a limited area defined by the radiation pattern of the antenna elements.

Moreover, subsequent addition of tiers to the hub may be accomplished, as was discussed above with respect to the addition to individual antenna elements. For example, where it is determined that a hub including any combination of tiers is insufficient to provide the required communication density, antenna elements comprising any number of additional tiers may be added. Of course, where only a particular portion of the area serviced by the hub requires increased communication density, the added tiers may include only those antenna elements having a radiation pattern covering the particular portion needing increased communication density, if desired.

Alternatively, the tiers of antenna elements could be disposed to provide different radio communication coverage areas about hub 101. Such differences in radio communication coverage may be accomplished, for example, by adjusting the different tiers to have differing amounts of "down tilt" with respect to the vertical axis. Dow tilt of the tiers may be accomplished by the physical tilting of the individual antenna elements or by any number of beam steering techniques know in the art. Additionally, adjustment of the down tilt may be made periodically, such as dynamically during antenna operation, by the inclusion of a mechanical adjustment or the aforementioned beam steering techniques.

Additionally, antenna elements having different radiation pattern attributes may be utilized to provide the defined radio communication coverage areas discussed above. For example, antenna elements utilized to provide communication in an area near a hub may provide a radiation pattern having a broader beam, and thus a lower gain, than the preferred embodiment of the antenna elements described above. Likewise, antenna elements utilized to provide communication in an area more distant from the hub may provide a radiation pattern having a narrower beam, and thus a higher gain.

Where the antenna elements of a tier have a different down tilt or radiation pattern, the individual tiers could be used to provide coverage patterns forming concentric circles combining to provide substantially uninterrupted coverage of a predefined area around hub 101. Of course, only individual antenna elements may be adjusted to have a down tilt or radiation pattern different than other antenna elements of the tier or hub. Either arrangement could be utilized to provide substantially homogenous communication coverage where, for example, geographic elements exist which interfere with the various radiation patterns. Likewise, this alternative embodiment may be utilized to compensate for any number of near/far related communication anomalies.

It can be seen in FIG. 2C that hub 101 includes outdoor unit (ODU) controller 230 coupled to each individual antenna element 200. ODU controller 230 is coupled to RF modem 240 and indoor unit (IDU) controller 250. Although a separate connection from ODU controller 230 is illustrated to modem 240 and CPU 260, it shall be appreciated that communication between ODU controller 230 and IDU controller 250 may be accomplished through the path connecting modem 240 to the ODU controller and CPU 260. Similarly, control information relevant to the operation of ODU controller 230 may be generated by modem 240 rather than CPU 260 and therefore be communicated through a connection between ODU controller 230 and modem 240.

ODU controller 230 includes circuitry suitable for enabling the various antenna elements of hub 101 to communicate with RF modem 240 at the proper interval so as to transmit or receive the desired signal. In one embodiment, ODU controller 230 includes a time division digitally controlled switch operating in synchronization with burst periods defined by IDU controller 250. Preferably, IDU controller 250 provides a strobe pulse to the switch of ODU controller 230 to provide switching in synchronization with burst periods defined by IDU controller 250. It shall be appreciated that utilization of such a switch provides simple integration into the antenna array at a low cost. However, any switching means synchronizable to the burst periods defined by IDU controller 250 may be used if desired.

Operation of ODU controller 230 results in each individual antenna element being in communication with IDU controller 250 according to a predetermined regime of communication sequence timing, i.e., frames of burst periods. This, in turn, results in each individual antenna element being in communication with modem 240 within IDU controller 250. It shall be appreciated that such switching results in the time division multiplexing (TDM) of each antenna element to modem 240.

Figure 8:
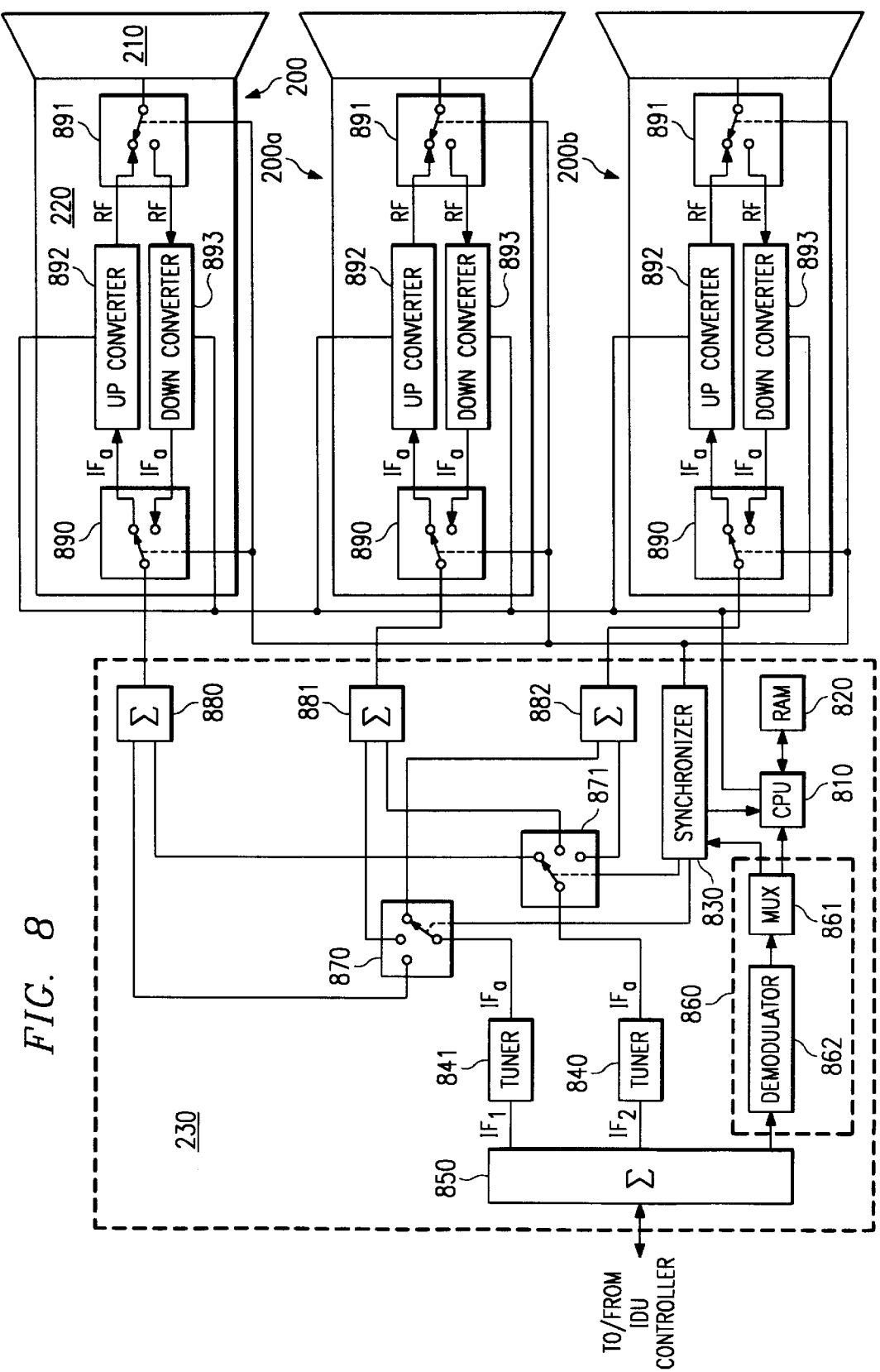

Of course, where the individual antenna elements provide bi-directional communication, a second connection between ODU controller 230 and the various antenna elements, such as show in FIG. 8, may be provided. Such a connection may be utilized to provide synchronization, such as through the above discussed strobe pulse, to circuitry within the antenna elements to select between transmit or receive circuits at a proper frame and/or burst period. Through the selection of transmit and receive circuitry in combination with the switching of ODU controller 230, the antenna elements may be coupled to modem 240 at the proper instances to provide bi-directional communication through modem 240 resulting in time division duplexing (TDD) as described in detail hereinafter with respect to a best mode of practicing the invention.

Moreover, in addition, or in the alternative, to control for TDD switching of antenna elements, a connection between the antenna elements and ODU 230 may be utilized for other control functions. For example, a control signal through such a connection may be used to dynamically adjust an antenna element for a particular frequency determined to be suitable for communication with a communication device during a particular burst period of a frame. In a preferred embodiment, a control signal is provided by CPU 810 to a tuner, such as up/down-converters 892 and 893 within antenna module 220, as show in FIG. 8. Such a control signal may be provided by the control processor to program phase lock loop circuitry, or synthesizer hardware, within the various antenna modules to select a particular frequency for transmission and/or reception of communicated information. Likewise, a control signal may be provided to adjust the amplitude of a transmitted or received signal. For example, tuners 892 and/or 893 may include amplification /attenuation circuitry adjustable under control of such a control signal. It shall be appreciated that both of the above described control functions result in a method by which the various antenna elements may be dynamically configured to communicate with nodes of the system.

IDU controller 250 includes a processor identified as CPU 260, electronic memory identified as RAM 270, and a interface and/or router identified as interface/router 280. Stored within RAM 270 is a switching instruction algorithm to provide switching instruction or synchronization to ODU controller 230. Buffering for information communicated through modem 240 or interface/router 280 may also be provided by RAM 270. Likewise, RAM 270 may also contain additional stored information such as, for example, antenna element correlation tables, link management information, initialization instructions, modem configuration instructions, power control instructions, error correction algorithms, and other operation instructions discussed further below.

Although a single modem is depicted in FIG. 2C, it shall be appreciated that the hub system of the present invention is fully scalable to include any number of modems depending on the information communication capacity desired at the hub. Attention is directed toward FIG. 7 where the IDU controller of the present invention adapted for TDD communication is illustrated as including two modems.

Figure 7:
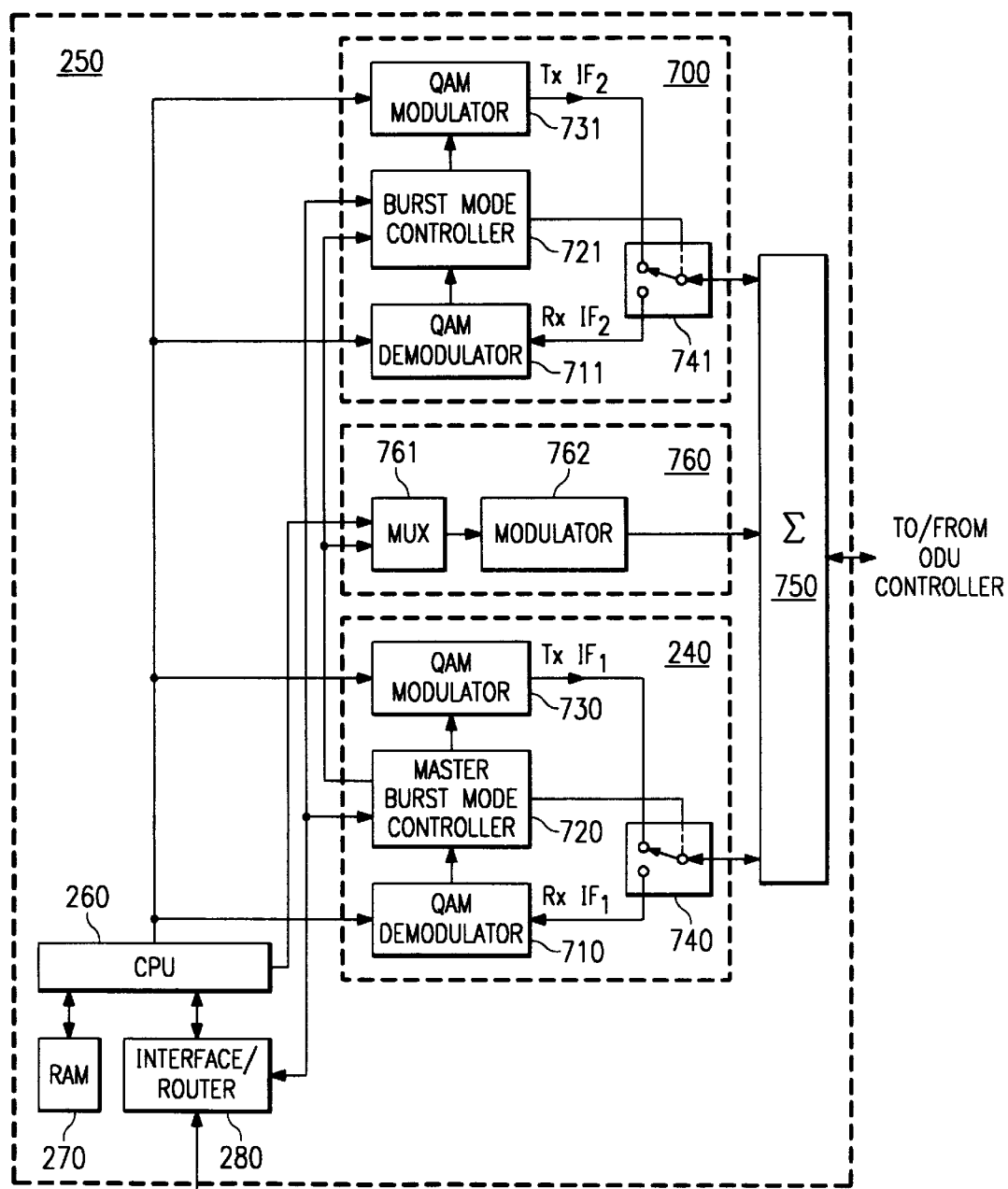
FIGS. 7–8 illustrates of a preferred embodiment of the various components of a hub of the present invention.

Modems 240 and 700 of FIG. 7 are similarly configured to include burst mode controllers 720 and 721, QAM modulators 730 and 731, QAM demodulators 710 and 711, as well as channel direction control circuitry, shown as TDD switches 740 and 741. However, it shall be appreciated that burst mode controller 721 is synchronized with master burst mode controller 720 as well as sync channel modulator 760. This synchronization of burst mode controllers, illustrated as a control signal provided by master burst mode controller 720, is to provide a means by which the burst periods, and thus the communication frames, of the modems as well as the TDMA switching of the individual antenna elements may be fully synchronized. In the preferred embodiment, the synchronization clock is sourced from interface/router 280 and is derived from the bit stream by master burst mode controller 720. Of course, synchronization may be accomplished by means other than the use of a control signal provided by a master burst mode controller, such as the use of internal or external clock sources, if desired. One advantage of synchronization of the various components of the hub is restricting transmission and reception by each of the individual antenna elements to predefined time periods which allows for a greater reuse of channels as is discussed in detail with respect to the best mode for carrying out the present invention.

It shall be understood that sync channel modulator 760 provides a means by which the timing information of the burst mode controllers may be modulated for provision to ODU controller 230. It shall be appreciated that in the preferred embodiment where CPU 260 provides control signals to the ODU for the above discussed control functions, sync channel modulator 760 may also include MUX 761 to provide a multiplexed signal to modulator 762.

Preferably the signals of the various modems of the hub are imposed upon different carrier frequencies, such as is illustrated by $IF_1$ of modem 240 and $IF_2$ of modem 700. Similarly, sync channel modulator 760 imposes the control signal including the burst mode timing information and control functions on a suitable IF. These separate signals may the be easily combined by splitter/combiner 750 for transmission through a unitary coupling to ODU controller 230. Of course the same IF could be used as a carrier by the modems of the hub if, for example, multiple connections or a multiplexer connection were maintained between IDU controller 250 and ODU controller 230.

It shall be appreciated that increasing capacity by adding multiple modems to IDU controller 250 requires circuitry inODU controller 230 in addition to the switch enabling TDMA access to a single data stream of one modem discussed above. Attention is now directed toward FIG. 8 wherein ODU controller circuitry corresponding to the inclusion of multiple modems within IDU controller 250 is shown.

It shall be appreciated that switches 870 and 871 and signal splitter/combiners 880, 881, and 882 in combination with synchronizer 830 accomplish TDMA switching of the antenna elements with respect to the individual modems as described previously with reference to the use of a single modem. There is also illustrated, in communication with CPU 810, sync channel modulator 860 utilized to demodulate the burst mode control signal and various other control signals provided the ODU by the unitary connection illustrated. In the preferred embodiment, where control signals are transmitted from the IDU controller to the ODU controller, sync channel modulator includes MUX 861 in combination with demodulator 862 to provide CPU 810 with control information was well as providing synchronizer 830 with timing information . Of course, where multiple connections are used between the ODU and IDU, sync channel modulator 860 may be omitted.

Switches 870 and 871 are adapted to provide selection of the different data streams provided by each modem, as tuned to a common intermediate frequency by tuners 840 and 841, to the antenna elements. In the preferred embodiment, as discussed above, module 220 of the antenna element is adapted to accept intermediate frequencies and convert them for transmission at the desired frequency through horn 210. In the preferred embodiment, module 220 is adapted to accept a single IF. Therefore, ODU controller 230 includes tuners 840 and 841 to adjust the various intermediate frequencies of the different modems, here $IF_1$ and $IF_2$, to a common intermediate frequency $IF_a$. It shall be appreciated, although a single bi-directional tuner for each IF is illustrated, that a separate tuner for the transmit and receive signal path, coupled to the bi-directional signal path by TDD switches, may be utilized if desired. Such an arrangement is discussed in detail below with respect to antenna module 220.

Although being adjusted to a common frequency, the signals from the modems are physically separated for switchable connection to a proper antenna element, through signal combiners 880, 881, and 882, by switches 870 and 871 under control of synchronizer 830. It shall be appreciated that, by controlling switches 870 and 871, any sequence of burst periods from any modem may be transmitted by any antenna element.

Although selection of the signal modulated by a particular modem has been discussed with reference to switches operating under control of a synchronizer circuit, it shall be appreciated that this function may be accomplished by any number of means. For example, module 220 may be adapted to accept various intermediate frequencies. A variable tuner in module 220, such as through the use of programmable phase lock loop circuitry, could be utilized to select a signal modulated by a particular modem from a composite signal by tuning to a particular intermediate frequency under control of CPU 810 and synchronizer circuitry 830. Of course, where tuners are utilized to discriminate between the various signals modulated by the modems, tuners 840 and 841 as well as switches 870 and 871 and signal combiners 880, 881, and 882 may be eliminated, if desired.

It shall be appreciated that the use of short burst periods, such as on the order of micro-seconds, requires that such a variable tuner tune to a desired frequency and reach a steady state quickly in order to avoid significant signal distortion . Consistent with this, experimentation has revealed that the use of the above mentioned switching matrix is advantageous in providing selection of the various signals within the burst periods contemplated.

In the preferred embodiment, each antenna element is adapted for bi-directional communication . Therefore, each antenna module 220 may include TDD switches 890 and 891 coupled to synchronizer 830 to provide synchronous switching the antenna element during transmit and receive frames, as is illustrated with respect to antenna element 200.

Moreover, as it is anticipated that the communicated RF frequency of the system will be different than that of the IF utilized within the various components of the communication system, each antenna module 220 may also include a tuner to up-convert and/or down-convert the IF to the desired RF for radio communication . The use of tuners to both up-convert and down-convert the signal is illustrated in FIG. 8 as up converter 892 and down converter 893. It shall be appreciated, although a converter is illustrated for both the transmit and receive signal path within antenna module 220, that a single bi-directional converter may be utilized if desired. Of course, where a bi-directional converter is used, TDD switches 890 and 891 may be eliminated to result in a configuration as discussed above with respect to IF tuners 840 and 841.

It shall be appreciated that the use of a series of converters may be utilized to accomplish the up-conversion and/or down-conversion of the signal. For example, in the preferred embodiment where a intermediate frequency of 400–500 MHz and a radio frequency of approximately 38 GHz are used, a single stage converter to up-convert or down-convert between the frequencies requires significant signal filtering to discriminate between various sidebands generated very near the frequency of interest. As such, it is preferable to up-convert and/or down-convert the signal instages, such as through a intermediate frequency of 3 GHz. Therefore, in the preferred embodiment, converters 892 and 893 include multiple stages of converters to up-convert or down-convert the signal betwee 400–500 MHz, 3 GHz, and 38 GHz.

It shall be understood that an intermediate frequency closer to the radio frequency may be utilized, thus eliminating the need for both precise filtering of the converted signal and the above described multi-stage conversion. However, it shall be appreciated that it is typically more economical to manufacture a switching matrix suitable for lower frequencies than for higher frequencies. Therefore, in the preferred embodiment, a intermediate frequency significantly lower than the radio frequency to be transmitted is utilized.

In the preferred embodiment, where EHF radio frequency is used, data communication is provided by breaking the available spectrum down into discrete channels for frequency division multiplexing (FDM). In the case where, for example 38 GHz is used, the available spectrum may be the 1.4 GHz spectrum between 38.6 GHz to 40.0 GHz. This 1.4 GHz spectrum may advantageously be subdivided into 14 channels of 100 MHz each. Of course, as is discussed hereinafter with respect to a best mode for carrying out the present invention, other divisions of the available spectrum which provide a signal bandwidth sufficient to communicate the desired information may be adopted.

To enable full duplexing using FDD as discussed above, a single 100 MHz channel may be further subdivided into a pair of 50 MHz channels whereby there is defined a 50 MHz transmit (Tx) channel and a 50 MHz receive (Rx) channel. Of course, each 100 MHz channel may be fully utilized as either a Tx or Rx channel, if desired. It shall be appreciated by one of skill in the art that utilization of the full 100 MHz spectrum of a channel results in a half duplex channel, as no spectrum remains within that channel to enable reverse transmission of information. However, as is discussed hereinafter with respect to the best mode, full duplexing may be synthesized on any single channel through the use of TDD to provide a Tx and Rx frame within the channel.

Each Tx and Rx channel may similarly be divided into 5 discrete sub-channels of 10 MHz each, resulting infrequency-division multiplexing of the 50 MHz Tx and Rx channels. Due to the aforementioned TDMA of each antenna element, each channel is divided into predefined TDMA time slots. These TDMA time slots may be further broke down into protocol time slots; a protocol time slot being a sufficient time for communicating a information packet formatted to a predefined protocol. For example, each 10 MHz sub-channel may be utilized to communicate three 10 Mbps Ethernet data packets in a 250 μsec TDMA time slot utilizing 64 QAM. Alternatively, these sub-channels may be utilized to provide different data throughput such as one 10 Mbps Ethernet data pack ina 250 μsec frame with quaternary phase-shift keying (QPSK) for example. Furthermore, each Tx and Rx channel may be utilized as a single channel spanning the full 50 MHz bandwidth, without frequency division, if desired.

Figure 3A:
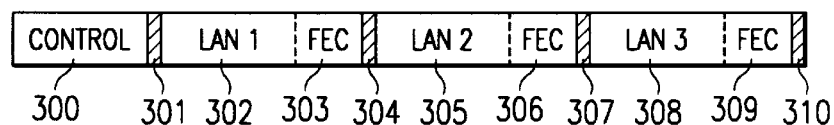
FIG. 3A illustrates a embodiment of the composition of a signal communicated by the present invention during a time division multiple access burst period.

A example of sub-channel 30 Mbps communication per TDMA time slot formatted as three Ethernet data packets is show in FIG. 3A. There the 250 μsec frame contains control header 300 followed by guard time sync field 301. Sync field 301 is followed by 10 Mbps LAN data packet 302 and forward error correction data 303, which is itself followed by guard time sync field 304. Sync field 304 is similarly followed by 10 Mbps LAN data packet 305 and forward error correction data 306 as well as guard time sync field 307. Sync field 307 is trailed by 10 Mbps LAN data packet 308 and forward error correction data 309 also followed by guard time sync field 310. It shall be appreciated that this example of 30 Mbps communication is but one embodiment of the composition of a signal withina single channel of the present invention. There are innumerable methods by which to utilize the above disclosed frequency spectrum for communication. It shall be understood that any such method may be utilized according to the present invention.

In addition to communication of information between processor-based systems through hub 101, control functions may also be communicated between hub 101 and node 150. A example of such control communications is illustrated in FIG. 3A as control header 300. Alternatively, control functions may be communicated through a predetermined channel or sub-channel of the FDM spectrum. These control functions might include requests for re-transmission of a data packet, requests to adjust the amplitude of the transmitted signal, TDM timing information, instructions to adjust the modulation density, or dynamic assignment of hub resources. The use of such control functions are discussed in further detail below.

Figure 6:
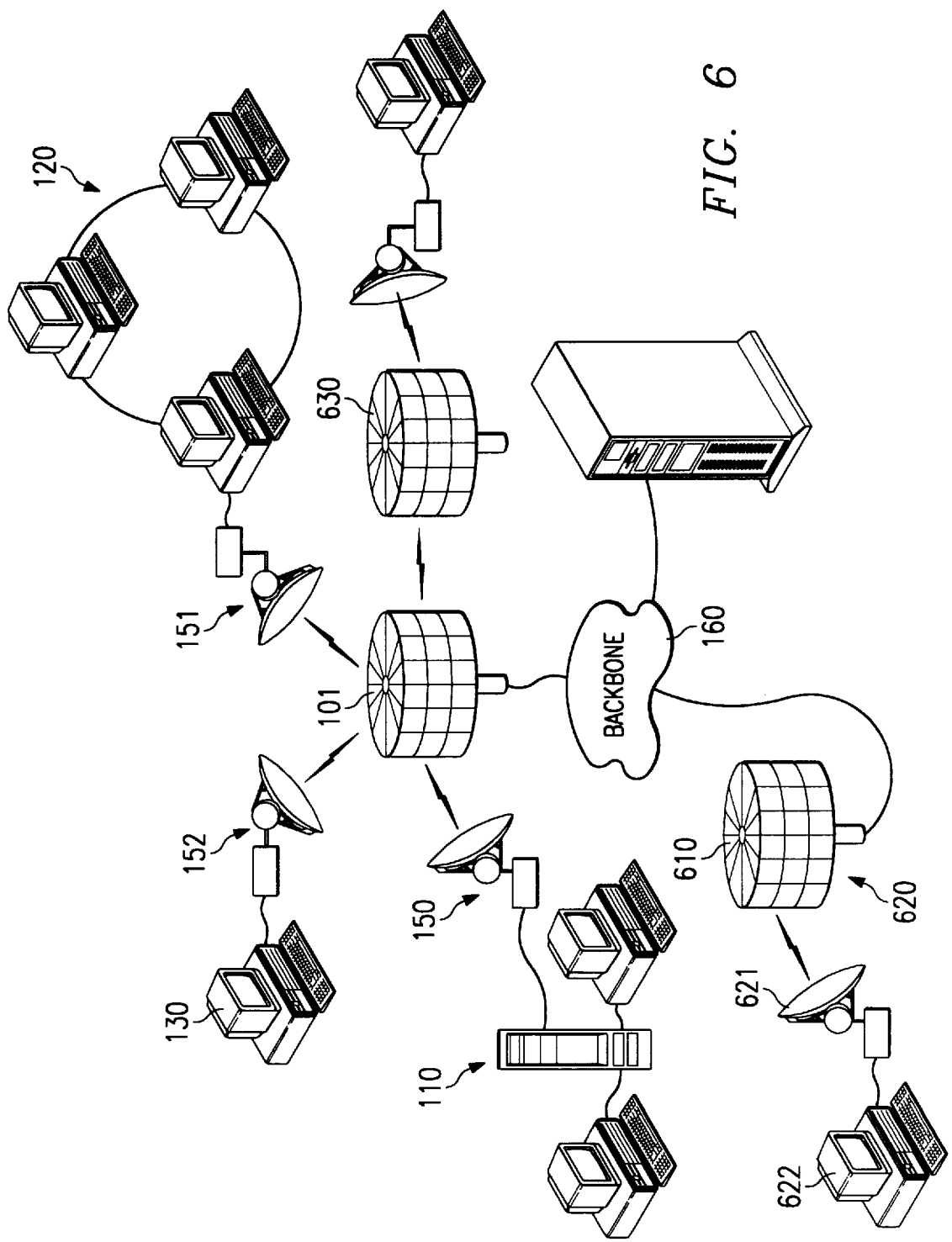
FIG. 6 illustrates the interconnection of processor-based systems through a network of hubs of the present invention.

Information communicated to IDU controller 250 via the antenna elements may be re-directed by hub 101 through a backbone, such as backbone 160 illustrated in FIG. 6, ultimately to other processor-based systems. It shall be understood that a plurality of such backbone communications means may be coupled to a single hub 101.

Alternatively, information communicated to IDU controller 250 may be re-directed by hub 101 through a preselected antenna element, when switched in communication with controller 250, ultimately to be received by another processor-based system. Directing attention again to FIG. 6, this communication path is illustrated, for example, by network 110 communicating through hub 101 to network 120.

Larger geographical distances between two communicating processor-based systems may be bridged by utilization of multiple hubs. For example, as illustrated in FIG. 6, hubs 101 and 630 are in communication through an air link via antenna elements. These two hubs may provide information communication between any combination of processor-based systems in communication with either hub.

It shall be appreciated that information received by IDU controller 250 of hub 101 may be re-directed in a variety of ways. In one embodiment, IDU controller 250 correlates communication through a particular antenna element 200, or burst period associated therewith, as indicated by control of ODU controller 230, with a predefined communication path. According to this method, communication received by IDU controller 250 at antenna element 200a illustrated in FIG. 2C, for example, may be routed by IDU controller 250 through antenna element 200b, as indicated by a correlation table, or the like, in RAM 270. Such a correlation table, or other correlation information, could be utilized by IDU controller 250 to direct any communication received through a particular element, burst period, or channel of hub 101, including a backbone, to another particular element, burst period, or channel of hub 101. Such a embodiment is efficient where, for example, a processor-based system, in communication with hub 101 through antenna element 200a, is only desirous of communicating with a processor-based system, in communication with hub 101 through element 200b.

However, where a processor-based system is desirous of communicating through hub 101 with a plurality of different processor-based systems, or a single antenna element is utilized by a plurality of processor-based systems, the above described correlation table may be ineffective. Therefore, in a preferred embodiment, information communicated through hub 101 includes routing information . Such information is preferably in the form of data packets conforming to the open systems interconnection (OSI) model. A example of OSI routing information that may be utilized in this embodiment is the transmission control protocol (TCP) standard. However, it shall be understood that any routing information which indicates the destination of a received data packet, regardless of conforming to the OSI model, may be utilized by the present invention if desired.

It shall be understood that modem 240 modulates and demodulates communication between the antenna elements and IDU controller 250. Therefore, RF communication received at any antenna element may be stored within RAM 270 as digital information. Interface/router 280 may utilize predetermined pieces of information contained within the digital information, such as may be stored in RAM 270, to determine the routing of the received communication. In the preferred embodiment, routing information is provided by the network layer of a data packet conforming to the OSI model. Such information would be, for example, contained within each LAN data packet illustrated in FIG. 3.

Upon determination of proper routing by utilizing information contained within the communicated information, the digital information may be re-directed by hub 101 through backbone 160 or through an antenna element via modem 240. It shall be understood that, because of the utilization of TDMA, the digital information may be stored in RAM 270 until such time as ODU controller 230 couples the correct antenna element, as determined by the routing information, to IDU controller 250, and thus provides the necessary route for communication.

Figure 4:
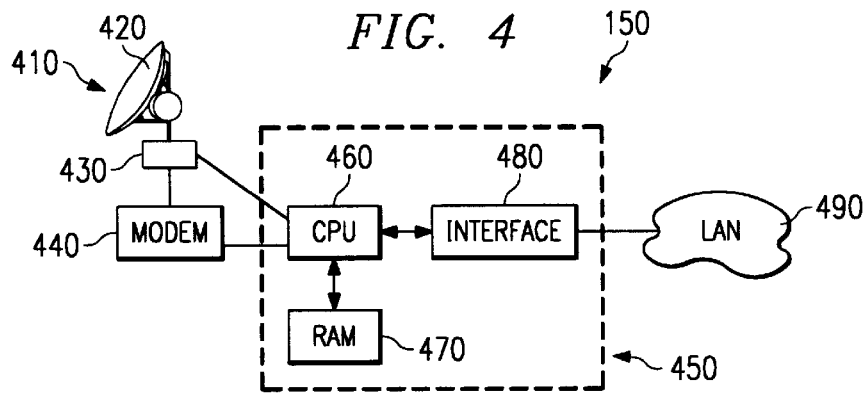
FIG. 4 illustrates a embodiment of a node of the present invention.

Having described in detail hub 101 of the present invention, attention is now directed toward FIG. 4 wherein node 150 is more fully illustrated. In a preferred embodiment node 150 is comprised of two primary components, outdoor unit 410 and indoor unit 450, as depicted in FIG. 4.

Outdoor unit 410 includes antenna 420, module 430 and modem 440. Where EHF is used, antenna 420 is preferably a parabolic dish antenna providing approximately 42 dB of gain with a communication lobe of approximately 2 degrees. Module 430, like module 220 discussed above, is a synthesized mmWave front-end module accepting and transmitting 38 GHz RF through antenna 420 converted to an IF in the range of 400–500 MHz for communication with RF modem 440. Preferably, module 430 includes the various tuner and TDD switching components illustrated in FIG. 8 with respect to module 220. However, it shall be understood that any number of component configurations are acceptable for use in module 430, as they are in module 220. It shall be appreciated that the link illustrated between CPU 460 and module 430 may provide a signal controlling the synchronized switching the synchronized switching of the TDD switches according to a TDD frame of an associated hub. Modem 440 may be a variable rate modem, having a fixed baud rate with a variable density of bits per symbol, corresponding to the use of a variable rate modem utilized at a associated hub. Of course the antenna and module attributes of node 150 may be different than that stated above where, for example, a different carrier frequency or beam patter is desired.

Indoor unit 450 includes CPU 460, RAM 470 and interface 480. It shall be understood that indoor unit 450 and outdoor unit 410 are coupled such that information received by antenna 420 as RF energy is communicated to indoor unit 450.

Interface 480 provides data communication between indoor unit 450, and thus node 150, and a processor-based system such as LAN 490 illustrated in FIG. 4. Furthermore, interface 480 formats the data communication to be compatible with the processor-based system so coupled. As for example, where LAN 490 is coupled to node 150, interface 480 may both send and receive Ethernet data packets where LAN 490 utilizes Ethernet compatible communication protocol. However, where node 150 is coupled to a single computer, it may be advantageous for interface 480 to provide a synchronous receive/transmit protocol. It shall be appreciated by one of skill in the art that interface 480 may include multiple communications protocols within a single embodiment, being user selectable, or may be individual modules to be included within controller 450 as needed.

RAM 470 is coupled to both interface 480 and CPU 460. Where TDM is being used at hub 101, RAM 470 may store information received at node 150 through interface 480 while awaiting transmission to hub 101. RAM 470 may also contain additional stored information such as, for example, initialization instructions and link management information such as modem configuration instructions, power control instructions and error correction instructions discussed in detail below.

Having described hub 101 and node 150 of the present invention in detail, interaction of these elements shall now be described. As discussed above, RAM 270 of hub 101 and RAM 470 of node 150 may include instructions for the operation of CPUs 260 and 460 respectively. These instructions may include, for example, a method for programming hub 101 and node 150 for communication and a method for link management including communication error correction.

Additionally, both RAM 270 and RAM 470 may temporarily store information communicated via the device for re-transmission in the case a transmission error is detected. Transmission error may be detected by CPUs 260 and 460 by various methods. One such method well know in the art is the transmission of error detection information accompanying transmitted data packets. Such a method is defined in the data link layer of the aforementioned OSI model.

Figure 3B:
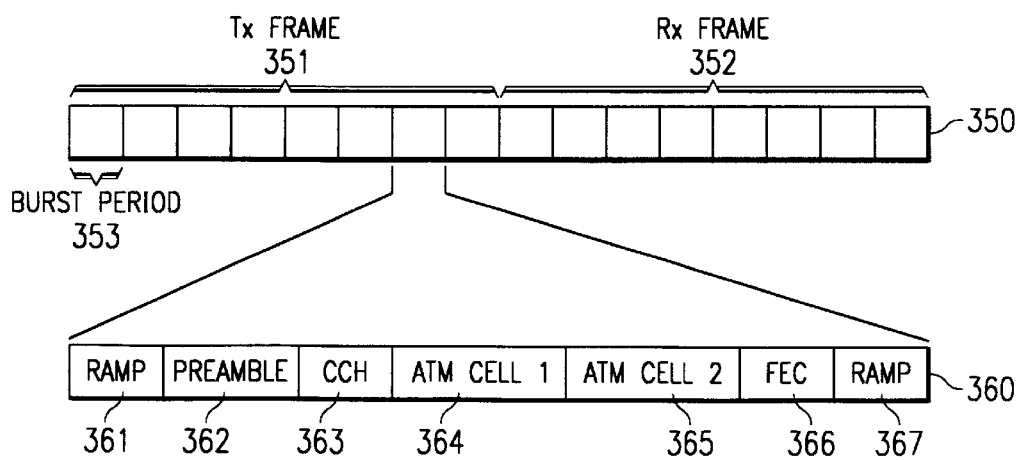
FIG. 3B illustrates a embodiment of the composition of a signal communicated by the present invention during a time division duplex burst period.

Attention is directed toward FIGS. 3A and 3B, wherein each of the three illustrated data packets includes associated forward error correction (FEC) information. It shall be appreciated that FEC information may include a summary indication of the content of the associated data packet by such means as a checksum, a parity indication, or the like. This summary indication may be generated by the transmitting CPU, CPUs 260 or 460, or may be integral to the particular transmission protocol utilized by the processor based systems as, for example, data packets conforming to Ethernet protocol. Regardless of its source, this information may be utilized to detect errors in the transmitted data and to subsequently correct the error such as by requesting retransmission of the effected data packets.

As discussed above, both RAM 270 and RAM 470 store communicated information in a form readable by CPUs 260 and 460 respectively. Therefore, CPUs 260 and 460 may utilize predetermined pieces of information contained within the digital information in RAM 270 and RAM 470 respectively to detect communication errors. For example in the embodiment illustrated in FIG. 3A, the receiving CPU may generate a summary indication of the content of each LAN data packet stored within RAM and compare this to the associated FEC information. Upon determining a difference between the two summary indications, the receiving CPU may request re-transmission of the LAN data packet by the sending CPU.

However, in a preferred embodiment, the FEC information includes data redundancy in the data stream using special encoders. Upon detection of a transmission error, decoders available at a recipient site may be utilized to provide error correction of portions of the data stream. Such error correction from encoded redundant data is capable of correcting transmitted information which includes up to a predetermined percentage of errors in the transmission. Preferably, the FEC information so utilized is a block code such as the Reed-Solomo FEC protocol.

For example in the embodiment illustrated in FIG. 3B, the receiving CPU may decode information transmitted within the FEC data packet and compare this information to the content of each ATM data packet stored within RAM. Upon detecting a transmission error through such comparison, the receiving CPU may correct the ATM data packet utilizing redundant data encoded in the FEC data packet. Of course, where transmission of the data packet is effected to the point of being beyond correction utilizing the encoded redundant data of the FEC data packet, retransmission of the data packet may be utilized, if desired.

As previously discussed, a predetermined sub-band of a communication channel may be utilized for the transmission of control functions such as the above mentioned retransmission request or other control functions, such as power level adjustment and information density adjustment. Alternatively, control functions may be included in each TDMA burst transmission as, for example, control header 300 illustrated in FIG. 3A or control channel block 363 illustrated in FIG. 3B. For example, the corresponding CPU will detect the request for re-transmission present in the predetermined control function sub-band or control header and respond with re-transmission of the requested IAN data packet.

Of course, if error free transmission of information or if error correction of the transmitted information is handled by another means, the above method of error correction may be omitted if desired. Furthermore, if TDM is not utilized and error correction by re-transmission of information is not desired, storage of communication information in RAM 270 and RAM 470 may also be omitted.

The preferred embodiment also includes a link maintenance algorithm to monitor communication parameters, such as errors in communications, associated with particular nodes 150 in RAM 270 of the hub. Upon determination of the existence of unacceptable communication parameters, such as a unacceptable error rate as determined by comparison to a predetermined acceptable error rate, CPU 260 may transmit a instruction to the particular node to make appropriate adjustment. For example, CPU 260 may instruct node 150 to adjust communication transmission power to achieve an acceptable error rate or to adjust the M-ary QAM signaling level (i.e., adjust the number of bits per symbol, hereinafter referred to as the QAM rate) at which information is transmitted. Of course, CPU 260 may also provide such control signals to the various QAM modulators associated with the hub to result in the proper modulation/demodulation of the signal communicated to the node. As above, these control functions associated with link maintenance may be communicated between CPU 260 and CPU 460 by means of a designated control function sub-band or control header.

Upon detecting a control instruction to adjust communications, CPU 460 provides the necessary instruction to the proper component. For example, as discussed above with respect to the hub, CPU 460 may cause module 430 to adjust transmission power or may cause modem 440 to adjust the QAM rate, depending on the attribute effected or the control information transmitted by the hub.

For example, a control signal may be provided by CPU 460 to a tuner within antenna module 430. Such a control signal may be provided by the control processor to program phase lock loop circuitry, or synthesizer hardware, within the antenna module to select a particular frequency for transmission and/or reception of communicated information . Likewise, a control signal may be provided to adjust the amplitude of a transmitted or received signal. For example, tuners within module 430, such as those illustrated in module 220 in FIG. 8, may include amplification/attenuation circuitry adjustable under control of such a control signal. These attributes, as well as the adjustment of the information density of communicated data, may be made by the node in response to a determination node at the hub and communicated through a control channel or may be made by a algorithm at the node. It shall be appreciated that adjustment of some attributes by the node may require a corresponding adjustment at the hub, such as with adjustment of QAM rate or channel. Therefore, the node may communicate control functions to the hub in such situations.

It shall be appreciated that periodic adjustment of communication parameters may be necessary, even where an initialization algorithm, as discussed in detail below, has been utilized to properly initialize such communication parameters, because of the occurrence of anomalies effecting communication. For example, although an initial QAM rate and/or transmission power level may be selected upon initialization of communication, various atmospheric conditions, such as rain, may cause significant signal attenuation. Therefore, it is advantageous to monitor communication parameters to provide adjustment compensating for the occurrence of such anomalies. It shall be appreciated that the monitoring of communication parameters and communication of control functions may be from a node to a hub where such node has detected unacceptable communication attributes.

In addition to storing communication information and associated link maintenance algorithms, in the preferred embodiment RAM 470 is utilized to store instructions to be utilized by CPU 460 in operating node 150. Such instructions may include channels in the available spectrum not to be utilized by node 150, windows of communication available for communication between node 150 and hub 101 due to TDM, and synchronizing information, such as frame timing and propagation delay offset, to enable TDM and/or TDD communication. Furthermore, RAM 470 may also store instructions to be utilized by CPU 460 for dynamic assignment of hub resources such as the above mentioned channels available for communication and windows of communication, or burst periods, as discussed hereinafter.

It shall be appreciated that, although in the preferred embodiment the antenna elements of hub 101 and antenna 420 of node 150 are pre-selected to use narrow beams, environments in which the invention is likely to be utilized may include physical topology causing reflection of transmitted signals. Such reflections are prone to causing multi-path interference in communication between node 150 and hub 101. Therefore, RAM 470 includes an initialization algorithm as part of the above mentioned communication instructions. Of course, such a initialization algorithm may be stored in a processor-based system in communication with node 150 to achieve the same results if desired.

The initialization algorithm operates in conjunction with a similar algorithm stored at hub 101. As with the initialization algorithm of node 150, the initialization algorithm utilized by hub 101 alternatively may be stored in a processor-based system in communication with hub 101 to achieve the same results. The initialization algorithm at hub 101 operates to cause node 150 to transmit a predetermined signal over the available spectrum to enable the mapping of communication parameters, such as signal strength, as received at each antenna element of hub 101. This information may the be utilized by the present invention to determine the individual antenna elements best suited for communication between node 150 and hub 101. This inturn determines the timing of communication windows, or burst periods, available to node 150 according to the TDM of these antenna elements. This timing information may the be stored in RAM 470 to enable CPU 460 to time transmission through antenna 410 to achieve synchronization with the switching of antenna elements by ODU controller 230. Of course, it may not be advantageous to utilize such initialization algorithms where, for example, multi-path and co-channel interference are not concerns. Therefore, the use of such initialization algorithms may be omitted, if desired.

Additionally, where a plurality of nodes are to be in communication with hub 101, co-channel interference may result from communication between several nodes. Therefore, the initialization algorithm discussed above may be instigated at each such node with hub 101 storing the communication parameters for each node. Thereafter, hub 101 may determine the possibility of co-channel interference between several nodes 150 and limit communication at each such node 150 to a subset of the available spectrum, i.e. assign different channels or burst periods to each such node 150. Additionally, this information may be utilized in the dynamic assignment of hub resources for use by a particular node. Such dynamic assignment may involve the temporary assignment of channels or burst periods previously assigned to a first node to another such node in times of underutilization by the first node.

The communication parameter information for each node may be utilized to determine the initial QAM rate, available with a variable modem as discussed above, to be utilized for a particular node. The initial QAM rate determination may be made based on a particular signal strength providing a suitable carrier to noise (C/N) ration for a particular QAM rate. For example, a C/N ration (BER=$10^{-6}$) of 11 dB has been found to be sufficient to sustain a modulation of 4 QAM. Similarly, a C/N ratio (BER=$10^{-6}$) of 21.5 dB has been found to be sufficient to sustain a modulation of 64 QAM.

Of course, as signal strength attenuates with distance, the QAM rate determination may alternatively be made by measuring the propagation delay of a transmitted signal, and thus the distance from the hub to the node. In the preferred embodiment, the propagation delay, and therefore the distance between node and hub, is determined by the node initially synchronizing to the frame timing established by the hub. Thereafter, the node transmits a shortened burst during a predetermined time slot. This transmitted burst will be offset from the hub frame timing by the propagation delay time. The hub utilizes this offset to compute the propagation delay, and thus the distance from the hub, associated with the transmitting node. Thereafter, a particular propagation delay or distance may be associated with selection of a particular QAM rate for the node.

Regardless of how the determination is made, the selection of a maximum QAM rate for a particular node allows for more efficient use of the available spectrum by increasing information density to those nodes having suitable communication attributes. Such increased information densities are possible, for example, to nodes located near the hub without an increase in transmission power as compared to less dense information communication to nodes located far from the hub.

Figure 5:
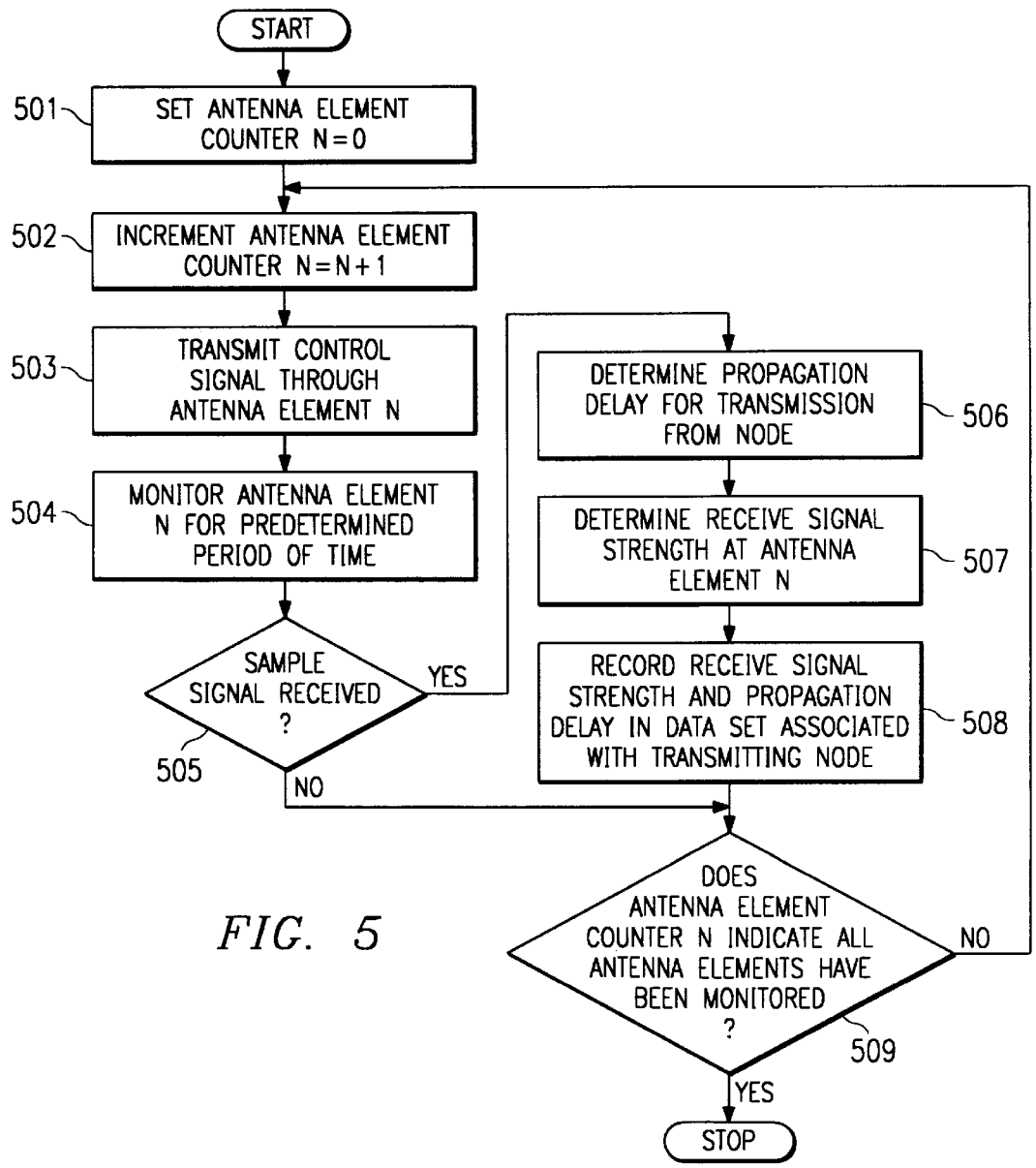
FIG. 5 illustrates a embodiment of the initialization algorithm utilized inconfiguring communication between the centralized communication array and nodes of the present invention.

Attention is now directed to FIG. 5 wherein a preferred embodiment of the initialization algorithm of hub 101 is illustrated. Although a single iteration of the initialization program illustrated, it shall be understood that the initialization program may be repeated for each node in communication with hub 101 to create a data set reflecting communication attributes of each node with respect to hub 101.

At step 501 antenna element counter N is initialized. It shall be appreciated that antenna element counter N may be utilized by the initialization program to reference the N number of individual antenna elements comprising the antenna array of hub 101. Thereafter, at step 502, antenna element counter N is incremented by one.

At step 503 the initialization program transmits a control signal through antenna element N requesting a node to transmit a predetermined sample signal. It shall be understood that transmission of the control signal is directed toward a predetermined node. The node may be selected from a data set of nodes known to be in communication with hub 101, or it may be selected by operator input such as a control signal from a node, or it may be determined from responses to a polling signal broadcast from hub 101.

At step 504 the initialization program monitors antenna element N for a predetermined period of time. It shall be understood that the amount of time the antenna element is monitored is predetermined to be an adequate amount of time for signals from the node, sufficient to cause multi-path interference, to be received. In a preferred embodiment, the predetermined amount of time for monitoring antenna element N is the time required for one complete TDM cycle through all N antenna elements of hub 101.

At step 505 it is determined whether a predetermined sample signal was received by antenna element N within the predetermined monitoring time. If no such sample signal was received, then it is assumed antenna element N is not in communication with the node for which initialization information is being sought. Therefore, the initialization program proceeds to step 509 to determine if all antenna elements have been monitored. If not, the program returns to step 502 and increments the antenna element indicator to monitor additional antenna elements.

It shall be understood that the transmission of a control signal and subsequent monitoring for a sample signal may be repeated at a single antenna element N. Repeated iterations at antenna element N may be utilized to provide a more accurate sample by statistically analyzing multiple results, thus, disregarding or minimizing anomalous results caused by superseding factors.

If a sample signal is detected at antenna element N, however, the initialization program continues to step 506 and determines the propagation delay of transmission of a signal from the node. It shall be understood that by knowing the time of transmission of the control signal from antenna element N and the time of reception of the sample signal at antenna element N, the initialization program can determine the propagation delay of a signal transmitted from a node to hub 101. Additionally, to increase the accuracy of this determination, the initialization program may analyze multiple transmissions as discussed above.

The initialization program also determines the signal strength of the sample signal received at antenna element N at step 507. It shall be understood that signal strength information is useful in determining individual antenna elements of hub 101 most desirable for utilization for communication between hub 101 and the node. Moreover, as discussed above, the signal strength and/or distance information determined by the initialization program may be used to select a QAM rate to provide maximum possible information density communication to a particular node. It shall be appreciated that, although such QAM selection is discussed here in reference to initializing communication parameters, such a determination may also be made dynamically throughout subsequent communications between various nodes and the hub.

At step 508 the initialization program stores information determined in the above steps in a data set associated with the particular node responding to the control signal. It shall be understood that such stored information may be utilized by hub 101 not only for initially assigning channels and individual antenna elements for communication with the node, but may also be utilized to dynamically configure communications between the devices in the case of hardware failure or other event causing communication interruptions.

At step 509 the initialization program determines if all N antenna elements have been accessed by the above steps. If not, the initialization program returns to step 502 to increment antenna element counter N. If all antenna elements have been accessed the initialization program ceases operation with respect to the selected node.

Having stored, in a data set associated with the node, attributes associated with communication through each antenna element of hub 101, the initialization program may then perform statistical analysis on the data to determine communication parameters such as a primary and secondary antenna element through which communications between a select node and hub 101 may take place. It shall be appreciated that information contained in the data set such as a high signal strength and a short propagation delay detected at an antenna element indicates the probability of a direct air link between the node and hub 101. As such the initialization program may assign this antenna element for communication with the selected node. Because each antenna element is in TDM communication with the RF modem, this assignment also identifies the timing of communication windows between the node and hub 101.

As discussed above, the mapping of communication characteristics may be repeated for each node. Therefore, the above statistical analysis may also compare communication attributes of other nodes when assigning antenna elements for communication with a selected node. For example, if one antenna element is determined to provide optimum communication between hub 101 and more than one node, only select channels available in the spectrum may be assigned to each such node. Or, as discussed hereinafter with respect to a best mode for carrying out the present invention, each such node may be assigned different TDM bursts within a channel within which to accomplish communication. Alternatively, the initialization program may assign such an antenna element to only one such node and assign a secondary antenna element, possibly providing less than optimum communication, to another such node.

Upon determining the assignment of antenna elements and channels for ones of the nodes in communication with hub 101, the initialization program transmits control signals to these nodes. The control signal may include information regarding the channels available for communication between a specific node as well as timing information to allow synchronization of communication between the node and the TDM antenna element of hub 101.

The timing information provided by the hub may include the aforementioned offset, determined during link initialization, to allow a node to anticipate transmission of a burst period to the hub, or retard reception of a burst period from the hub, by a time period sufficient to adjust for the signal propagation delay. It shall be appreciated that inclusion of such offset information in the TDM timing information allows for maximum information communication during a burst period. Of course, where maximum information communication is not desired, the timing information may not include any offset information. Here, a delay period, in which no information is transmitted, of sufficient duration to accommodate the propagation delay may be included in the burst period. However, it shall be understood that such a method of compensating for the signal propagation delay trades a decrease in information throughput in order to accommodate the delay.

As discussed previously, control information may be communicated by the hub through a predetermined subchannel utilized for control information or may be included within a logical channel or control channel embedded in the communication data packet as discussed above. A node receiving such control information will store it in RAM 470 for later utilization by CPU 460. Of course, where FDD is utilized by hub 101, it is unnecessary for RAM 470 to include timing information regarding communication windows with hub 101 and, therefore, such information may be omitted from the control information. Likewise, where communication between the hub and node is accomplished only upon a single channel, information regarding channels available for communication may be omitted from this control information.

As discussed above, this initialization information may also be utilized by the hub for dynamic allocation of hub resources to the nodes in communication therewith. It shall be understood that by monitoring information communication between the nodes and the hub on a continuing basis, the hub may determine utilization statistics of any particular node. If it is determined that any such node is under-utilizing hub resources available to the node, such as, for example, not transmitting information over a channel allotted to the node, the hub may reassign such resources, or portion thereof, to another node. It shall be appreciated that this reassignment may be accomplished by the use of the control signals discussed in detail above.

Having described various embodiments of the operation of the present invention in detail, a contemplated best mode for practicing this invention will now be described. The foregoing discussion has described both frequency division duplexing (FDD) and time division duplexing (TDD) as means by which to enable a full duplex link between the hub and a node or subscriber. The best mode for practicing this invention is contemplated to be by using a TDD arrangement is described herebelow. This best mode will be described with respect to FIGS. 7 and 8.

Experimentation has revealed that the utilization of a single channel at each antenna element of hub 101 providing TDD Tx and Rx frames, such as frames 351 and 352 illustrated in FIG. 3B, allows a desirable reuse factor of available channels. It shall be understood that a cellular frequency reuse pattern of a plurality of hubs of the present invention is envisioned. Such a cellular pattern presents added complexity in the reuse of individual channels as the use of the channels at each hub must also take into consideration use of channels at adjacent hubs.

To minimize the potential for co-channel interference and, to a certain extent, multi-path interference, synchronization of transmission and reception at each antenna element is desirable. For example each antenna element of hub 101 will transmit only during a predetermined Tx frame and will receive only during a predetermined Rx frame. Likewise, each hub of a network of such hubs may be synchronized to transmit and receive only during the same predetermined Tx and Rx frames. It shall be appreciated that the above scheme defines a TDD communication system.

Dividing the available spectrum into discrete channels of 10 MHz each provides a convenient means by which to practice the present invention. Preferably, each antenna element of hub 101 is adapted to transmit and receive at least a single 10 MHz channel as defined by the system. As described above, antenna elements adapted for a particular 10 MHz channel may be distributed throughout hub 101 to provide for reuse of each defined channel.

Additionally, each Tx and Rx frame may be divided into discrete burst periods to provide for TDMA utilization of each channel. Preferably Tx and Rx frames, each being 250 μsec, are divided into eight burst periods, as is illustrated in FIG. 3B, whereby full duplexing may be synthesized in sixteen such burst periods. As previously described, the TDMA burst periods may be further broken down into protocol time slots; a protocol time slot being a sufficient time for communicating an information packet formatted to a predefined protocol. For example, each channel may be utilized to communicate two 53 byte ATM cells in a TDMA burst period utilizing QAM.

It shall be appreciated that the use of 53 byte ATM cells is preferred as the protocol includes an 5 byte header that may be utilized by the present invention for routing information, as is discussed in detail hereinbefore. Additionally, the use of 53 byte ATM cells provides a sufficiently compact data packet to provide acceptable latency periods when transmitting full duplex voice or other signals sensitive to delay or signal latency.

A preferred embodiment of information formatting within a TDMA burst period is illustrated as burst 360 in FIG. 3B. Here each burst contains ramp 361 followed by preamble 362. Preamble 362 is followed by CCH block 363. CCH block 363 is followed by ATM cells 364 and 365 which in turn are followed by FEC block 366. FEC block 366 is similarly followed by ramp 367.

It shall be understood that in the above identified TDMA burst period ramps 361 and 367 are time segments within the burst period to allow for a transmitter to come to full power and to again de-energize without affecting the power at which message information is transmitted. Preamble 362 and forward error correction (FEC) block 366, like the ramp components, are system overhead components and are used to aid in the transmission of information contained in ATM cells 364 and 365. Specifically, preamble 362 contains a dotting pattern to resynchronize the symbol clock at a receiving site. FEC 366 provides for error detection and correction of the transmitted information. Control channel (CCH) 363, as previously discussed, is provided to communicate system control information.

It shall be appreciated that this example of information formatting is but one embodiment of communication utilizing TDMA burst periods. There are innumerable methods by which to utilize the above disclosed burst periods of the Tx and Rx frames for communication. For example, any of the above components could be deleted, as well as any number of different components added, if desired. Therefore, it shall be understood that the present invention is not limited to the format of the TDMA burst period illustrated.

It shall be appreciated that through the use of QAM as previously discussed, the information density of each ATM cell of burst 360 may be increased. For example, using two ATM cells, as illustrated in FIG. 3B, with 4 QAM, the time slot capacity realized is ½ DS1. Moreover, by utilizing increased modulation, this capacity may be increased. Using 16 QAM the time slot capacity realized is 1 DS1; using 64 QAM the time slot capacity realized is 1½ DS1; and using 256 QAM the time slot capacity realized is 2 DS1. It shall be understood that any combination of these densities may be realized by a single hub and/or antenna element by using the variable rate modem and initialization algorithm discussed previously.

It shall be understood that the burst periods of each Tx and Rx frame may be utilized by a single antenna element to provide channel TDMA to multiple nodes located within the antenna element's radiation pattern. For example, burst periods 1 and 2 may be used by an antenna element to provide communication to a first node while burst periods 3 through 7 are used by the same antenna element to provide communication to a second node. Likewise, a single Tx or Rx frame may be utilized by different antenna elements. For example, burst periods 1 through 4 may be used by a first antenna element to provide communication to a first node while burst periods 5 through 8 are used by a second antenna element to provide communication to a second node.

It shall be appreciated that combinations of the above mentioned TDMA use of the burst periods by a single antenna element and division of Tx and Rx frames between different antenna elements may be utilized by the present invention. For example, burst periods 1 and 2 may be used by an antenna element to provide TDMA communication to a first node and second node while burst periods 3 and 4 are used by a second antenna element to provide communication to a third node.

Although balanced duplexing is illustrated by the eight forward channel and eight reverse channel burst periods in FIG. 3B, it shall be understood that any combination of forward and reverse channel distribution may be utilized by the present invention. Of course, where all burst periods are utilized in either the forward or the reverse direction, time division duplexing is no longer accomplished by that channel.

Experimentation has revealed that information communicated by a system such as that of the present invention generally falls into one of three categories; those being substantially balanced full duplex communication, principally downlink communication, and principally uplink communication. Therefore, these communication needs may be satisfactorily met by one embodiment of the present invention by utilizing any one of three duplexing schemes for a particular subscriber.

The first duplexing scheme is the 50% forward/50% reverse channel distribution of burst periods described above with reference to TDD. It shall be appreciated that the 50%/50% distribution is advantageous where a significant amount of information is both being communicated downlink as well as uplink.

The second duplexing scheme is where approximately 94% of the burst periods are utilized to transmit information from the hub to a node (downlink), and the remaining 6% of the burst periods are utilized to transmit information in the reverse direction (uplink). Preferably such a 94%/6% duplex scheme is realized by utilizing fifteen of the sixteen burst periods illustrated in FIG. 3B as downlink burst periods and utilizing the remaining one burst period as an uplink burst period.

The 94%/6% distribution is advantageous where a significant amount of information is being communicated downlink, but little, or no, information is being communicated uplink. It shall be appreciated that the 6% reverse channel communication is preferably maintained by the present invention, even where there is no reverse channel information communication desired by the subscriber, as this small amount of bandwidth may be utilized by the system for link maintenance and control functions such as those described previously. For example, this 6% reverse channel communication may be used to request re-transmission of a data packet, requests to adjust the amplitude of the transmitted signal, TDM timing information, dynamic assignment of hub resources, or may be used to monitor communications attributes for the periodic adjustment of QAM modulation.

The third duplexing scheme is where approximately 6% of the burst periods are utilized to transmit information from the hub to a node (downlink), and the remaining 94% of the burst periods are utilized to transmit information in the reverse direction (uplink). It shall be appreciated that this scheme is simply the inverse of the above discussed 94%/6% scheme providing for substantial information communication in the uplink direction.

Although it is possible to define the TDD frames in combinations other than the three discussed above, as well as defining Tx and Rx frame combinations of each of these various schemes to include different numbers of individual burst periods, the preferred embodiment limits the schemes used to a predetermined number of combinations, each of which include the same total number of burst periods. It shall be appreciated that the three combinations of duplexing discussed above satisfactorily service the generally experienced information communication requirements. Moreover, use of a linked number of TDD schemes, each of which completing a forward and reverse channel communication frame in the same total number of burst periods, is advantageous in the reuse of channels throughout the system. By limiting the number and timing of such schemes, reuse patterns of the various channels in both a single hub as well as a cellular frequency reuse pattern are simplified.

Although the present invention and its advantages have been described in detail, it should be understood that various changes, substitutions and alterations can be made herein without departing from the spirit and scope of the invention as defined by the appended claims.

What is claimed is:

1. A system for providing broadband information communication between a plurality of locations, said system comprising:
   a plurality of nodes, each node having associated therewith at least one node antenna adapted for broadband communication in a frequency band of the millimeter wave spectrum of frequencies, said at least one node antenna having a predetermined communication beam to provide directional communication, said plurality of nodes comprising:
      a first node of said plurality of nodes adapted to communicate via at least a first frequency band of the millimeter wave spectrum of frequencies; and
      a second node of said plurality of nodes adapted to communicate via at least a second frequency band of the millimeter wave spectrum of frequencies; and
   a processor-based communication hub comprising:
      a plurality of hub antennas, each hub antenna having a predetermined communication beam to provide directional communication;
      a first hub antenna of said plurality of antennas adapted to communicate with said first node via said first frequency band of the millimeter wave spectrum of frequencies; and
      a second hub antenna of said plurality of antennas adapted to communicate with said second node via said second frequency band of the millimeter wave spectrum of frequencies.

2. The system of claim 1, wherein said first and second frequencies are the same.

3. The system of claim 1, wherein said first and second hub antennas are the same.

4. The system of claim 1, wherein said hub is coupled to a communications backbone.

5. The system of claim 4, wherein broadband access is provided between said hub and said coupled communications backbone.

6. The system of claim 4, wherein said communications backbone includes an information communication link selected from the group consisting of:
   a public switched network;
   a cable communication network;
   a broadband data grade connection; and
   the Internet.

7. The system of claim 1, wherein said hub is expandable to provide additional directional communication by coupling an individual antenna unit thereto, said coupled individual antenna unit thereby becoming a hub antenna of said plurality of hub antennas.

8. The system of claim 1, wherein at least one of said plurality of hub antennas is switchably connected to an internal signal provided within said hub.

9. The system of claim 8, wherein said hub further comprises a first radio frequency modem, said first modem providing said internal signal switchably connected to said at least one hub antenna.

10. The system of claim 9, wherein said hub further comprises a second radio frequency modem, said second modem providing a second internal signal switchably connectable to said at least one hub antenna.

11. The system of claim 9, wherein said first modem is dynamically configurable to provide variable information density within said internal signal.

12. The system of claim 11, wherein communication between ones of said plurality of hub antennas and ones of said plurality of nodes are sampled to identify at least one communication parameter.

13. The system of claim 12, wherein said variable information density is dynamically configured as a function of said at least one communication parameter.

14. The system of claim 13, wherein said at least one communication parameter is selected from the group consisting of:
   an error rate of a receive signal;
   a signal to noise ratio;
   a signal to interference ratio;
   a power level of a receive signal;
   a distance between said one of said plurality of hub antennas and said one of said plurality of nodes; and
   a signal propagation delay experienced in communication between said hub and one of said plurality of nodes.

15. The system of claim 8, wherein said internal signal is time divided to include a plurality of information bursts.

16. The system of claim 15, wherein said plurality of information bursts include at least a forward channel set of information bursts and a reverse channel set of information bursts.

17. The system of claim 16, wherein said forward channel set of bursts and said reverse channel set of bursts each include a predetermined number of bursts as a function of reuse of frequencies at said hub.

18. The system of claim 17, wherein said predetermined number of bursts are dynamically configurable.

19. The system of claim 16, wherein said forward channel set of bursts includes a different number of bursts than said reverse channel set of bursts.

20. The system of claim 16, wherein said forward channel information comprise a predetermined percentage of said plurality of information bursts and said reverse channel information bursts comprise the remaining percentage of said plurality of information bursts.

21. The system of claim 20, wherein said forward and reverse channel information bursts comprise a percentage of said plurality of information bursts selected from the group consisting of:
   approximately 94% forward channel information bursts and approximately 6% reverse channel information bursts;

approximately 50% forward channel information bursts and approximately 50% reverse channel information bursts; and approximately 6% forward channel information bursts and approximately 94% reverse channel information bursts.

22. The system of claim 8, wherein said switchable connection is accomplished according to a predefined regimen to provide time division multiple access of said internal signal to ones of said plurality of hub antennas.

23. The system of claim 22, further comprising:

means for said hub initially communicating with ones of said plurality of nodes according to a predetermined regimen; and means for causing attributes of said initial communication with ones of said plurality of nodes to be stored at said hub.

24. The system of claim 23, wherein said predefined regimen is determined at least in part as a function of said stored attributes.

25. The system of claim 1, wherein ones of said plurality of nodes further include a radio frequency modem, said modem being coupled to said node antenna.

26. The system of claim 25, wherein said modem is dynamically configurable to provide variable information density.

27. The system of claim 26, wherein said modem is adjusted to provide a particular information density upon receipt of a control signal from said hub.

28. The system of claim 26, wherein said variable information density comprises the use of quadrature amplitude modulation.

29. The system of claim 25, wherein a signal from said modem is time divided to include a plurality of information bursts.

30. The system of claim 29, wherein said plurality of information bursts include forward channel information bursts and reverse channel information bursts.

31. The system of claim 30, wherein said forward channel information bursts comprise a predetermined percentage of said plurality of information bursts and said reverse channel information bursts comprise the remaining percentage of said plurality of information bursts.

32. The system of claim 31, wherein said forward and reverse channel information bursts are defined to comprise a percentage of said plurality of information bursts selected from the group consisting of:

approximately 94% forward channel information bursts and approximately 6% reverse channel information bursts;

approximately 50% forward channel information bursts and approximately 50% reverse channel information bursts; and approximately 6% forward channel information bursts and approximately 94% reverse channel information bursts.

33. The system of claim 31, wherein said predetermined percentage is dynamically adjustable.

34. The system of claim 1, wherein said first and second frequency bands are within the range of 10 to 60 GHz.

35. The system of claim 1, wherein ones of said plurality of hub antennas comprise a hybrid mode lens corrected horn providing approximately 32 dB of gain with a predetermined communication lobe of approximately 16 degrees, operating within 10 to 60 GHz.

36. The system of claim 1, wherein ones of said plurality of nodes include an antenna comprising a parabolic dish providing approximately 42 dB of gain with a predetermined communication lobe of approximately 2 degrees, operating within 10 to 60 GHz.

37. The system of claim 1, further comprising a plurality of processor-based communication hubs, said plurality of hubs disposed to provide a cellular communication frequency reuse pattern.

38. The system of claim 37, wherein ones of said plurality of hubs are in information communication via a link provided at least in part by an antenna unit of each of the ones of said plurality of hubs.

39. The system of claim 38, wherein said link provides broadband access between the ones of said plurality of hubs.

40. The system of claim 38, wherein said information communication link is utilized at least in part to provide back-hauling of information between at least two hubs of said plurality of hubs.

41. The system of claim 37, wherein ones of said plurality of hubs are in information communication via a link provided by a physical link interconnecting each of the ones of said plurality of hubs.

42. The system of claim 1, further comprising a first set of hub antennas of said plurality of antennas adapted to communicate via at least said first frequency band of said plurality of frequency bands, each hub antenna of said first set disposed to provide substantially non-overlapping directional communication.

43. The system of claim 1, wherein each node has associated therewith one node antenna, said node antenna having a single predetermined communication beam to provide directional communication.

44. A system for providing broadband information communication between a plurality of processor-based systems, said system comprising:

a first communication node coupled to a first processor-based system, said first node comprising:

a communication unit including an antenna, a first radio frequency modem, and a first communication module coupled there between, said antenna adapted for receiving radio frequency communication in the extremely high frequency spectrum; and a first controller unit including a processor coupled to a first electronic memory and an interface, said processor also being coupled to said first modem, said interface being adapted for coupling to a processor-based system;

a second communication node coupled to a second processor-based system, said second node comprising:

a communication unit including an antenna, a second radio frequency modem, and a second communication module coupled there between, said antenna adapted for receiving radio frequency communication in the extremely high frequency spectrum; and a second controller unit including a processor coupled to a second electronic memory and an interface, said processor also being coupled to said second modem, said interface being adapted for coupling to a processor-based system;

a communication hub adapted for information communication with said first node and said second node, said hub comprising:

a plurality of antenna elements, each antenna element of said plurality of antenna elements adapted for receiving radio frequency communication in the extremely high frequency spectrum, each antenna element of said plurality of antenna elements having a hub communication module coupled thereto;

a third radio frequency modem, said third modem switchably coupled to at least one module of said plurality of antenna elements through a first switch, said third modem adapted to receive said communication from said hub module; and a third controller unit including a processor coupled to a third electronic memory and said switch, said processor also being coupled to said third modem.

45. The system of claim 44, wherein said hub is adapted to accept the coupling of an individual antenna element thereto, said coupled individual antenna element thereby becoming an antenna element of said plurality of antennas elements.

46. The system of claim 44, wherein ones of said antenna elements comprise a group of antenna elements, said antenna elements comprising said group having substantially non-overlapping radiation patterns.

47. The system of claim 44, wherein ones of said antenna elements comprise a first group of antenna elements and other ones of said antenna elements comprise a second group of antenna elements, and wherein ones of said antenna elements of said first group have radiation patterns substantially overlapping ones of said antenna elements of said second group.

48. The system of claim 44, wherein said hub further comprises a fourth radio frequency modem, said fourth modem switchably coupled to at least one module of said plurality of antenna elements through a second switch.

49. The system of claim 44, wherein said hub comprises a plurality of radio frequency modems, each modem of said plurality being switchably coupled to at least one module of said plurality of antenna elements through a switch.

50. The system of claim 44, wherein each of said first, second, and third modems is adapted to communicate information at various predetermined information densities.

51. The system of claim 50, wherein each of said first, second, and third modems are dynamically configurable to select ones of said various predetermined information densities.

52. The system of claim 44, wherein said hub is further adapted for coupling to an information communication backbone.

53. The system of claim 52, wherein said communication backbone provides information communication between a plurality of hubs, each hub of said plurality of hubs disposed to provide information communication within a substantially non-overlapping predetermined area.

54. The system of claim 44, wherein said third controller unit routes information communication received by said hub for transmission by said hub according to information contained within said information communication.

55. The system of claim 44, wherein said third controller unit routes information communication received by said hub for transmission by said hub according to information stored within said third controller unit.

56. The system of claim 44, wherein said extremely high frequency spectrum is a band of approximately 1.4 GHz at approximately 38 GHz.

57. The system of claim 44, wherein said hub communication module is adapted for converting said received extremely high frequency to a first intermediate frequency and said first communication module is further adapted for converting said first intermediate frequency to a second intermediate frequency.

58. The system of claim 57, wherein said first intermediate frequency is approximately 3 GHz.

59. The system of claim 57, wherein said second intermediate frequency is approximately 400 to 500 MHZ.

60. The system of claim 44, wherein said antenna comprises a parabolic dish providing approximately 42 dB of gain with a predetermined communication lobe of approximately 2 degrees.

61. The system of claim 44, wherein ones of said plurality of antenna elements comprises a hybrid mode lens corrected horn providing approximately 32 dB of gain with a predetermined communication lobe of approximately 16 degrees.

62. The system of claim 44, wherein said first switch is controlled by said processor according to a regimen stored in said second electronic memory.

63. The system of claim 44, wherein said hub further comprises an initialization algorithm stored in said third electronic memory, said initialization algorithm causing said hub to communicate with ones of said first and second node, said initialization algorithm further causing attributes of said communication with ones of said first and second node to be stored in said third electronic memory.

64. The system of claim 63, wherein said first controller unit of said first node controls information communication between said first node and said hub at least in part according to said regimen and said communication attributes stored in said second electronic memory.

65. A system for providing broadband information communication between a plurality of locations, said system comprising:

a plurality of nodes, each node having associated therewith at least one node antenna adapted for broadband communication in a frequency band of the millimeter wave spectrum of frequencies, said at least one node antenna having a predetermined communication beam to provide direction al communication, said plurality of nodes comprising:

a first node of said plurality of nodes adapted to communicate via at least a first frequency band of the millimeter wave spectrum of frequencies; and a second node of said plurality of nodes adapted to communicate via at least a second frequency band of the millimeter wave spectrum of frequencies; and a processor-based communication hub comprising:

a plurality of hub antennas, each hub antenna having a predetermined communication beam to provide directional communication, wherein at least one of said plurality of hub antennas is switchably connected to an internal signal provided within said hub, wherein said internal signal is time divided to include a plurality of information bursts, wherein said plurality of information bursts include at least a forward channel set of information bursts and a reverse channel set of information bursts, wherein said forward channel set of bursts and said reverse channel set of bursts are dynamically configurable;

a first hub antenna of said plurality of antennas adapted to communicate with said first node via said first frequency band of the millimeter wave spectrum of frequencies; and a second hub antenna of said plurality of antennas adapted to communicate with said second node via said second frequency band of the millimeter wave spectrum of frequencies.

66. The system of claim 65, wherein said hub is coupled to a communications backbone.

67. The system of claim 66, wherein broadband access is provided between said hub and said coupled communications backbone.

68. The system of claim 66, wherein said communications backbone includes an information communication link selected from the group consisting of a public switched network;
a cable communication network;
a broadband data grade connection; and
the Internet.

69. The system of claim 65, further comprising a first set of hub antennas of said plurality of antennas adapted to communicate via at least said first frequency band of said plurality of frequency bands, each hub antenna of said first set disposed to provide substantially non-overlapping directional communication.

70. A system for providing broadband information communication between a plurality of locations, said system comprising:
  a plurality of nodes, each node having associated therewith at least one node antenna adapted for broadband communication in a frequency band of the millimeter wave spectrum of frequencies, said at least one node antenna having a predetermined communication beam to provide directional communication, wherein ones of said plurality of nodes further include a radio frequency modem, said modem being coupled to said node antenna, wherein a signal from said modem is time divided to include a plurality of information bursts, wherein said plurality of information bursts include forward channel information bursts and reverse channel information bursts, wherein said forward channel information bursts comprise a predetermined percentage of said plurality of information bursts and said reverse channel information bursts comprise the remaining percentage of said plurality of information bursts, wherein said predetermined percentage is dynamically adjustable, said plurality of nodes comprising:
    a first node of said plurality of nodes adapted to communicate via at least a first frequency band of the millimeter wave spectrum of frequencies; and
    a second node of said plurality of nodes adapted to communicate via at least a second frequency band of the millimeter wave spectrum of frequencies; and
  a processor-based communication hub comprising:
    a plurality of hub antennas, each hub antenna having a predetermined communication beam to provide directional communication;
    a first hub antenna of said plurality of antennas adapted to communicate with said first node via said first frequency band of the millimeter wave spectrum of frequencies; and
    a second hub antenna of said plurality of antennas adapted to communicate with said second node via said second frequency band of the millimeter wave spectrum of frequencies.

71. The system of claim 70, wherein said modem is dynamically configurable to provide variable information density.

72. The system of claim 71, wherein said modem is adjusted to provide a particular information density upon receipt of a control signal from said hub.

73. The system of claim 71, wherein said variable information density comprises the use of quadrature amplitude modulation.

74. A system for providing broadband information communication between a plurality of processor-based systems, said system comprising:
  a first communication node coupled to a first processor-based system, said first node comprising:
    a communication unit including an antenna, a first radio frequency modem, and a first communication module coupled there between, said antenna adapted for receiving radio frequency communication in the extremely high frequency spectrum; and
    a first controller unit including a processor coupled to a first electronic memory and an interface, said processor also being coupled to said first modem, said interface being adapted for coupling to a processor-based system;
  a second communication node coupled to a second processor-based system, said second node comprising:
    a communication unit including an antenna, a second radio frequency modem, and a second communication module coupled there between, said antenna adapted for receiving radio frequency communication in the extremely high frequency spectrum; and
    a second controller unit including a processor coupled to a second electronic memory and an interface, said processor also being coupled to said second modem, said interface being adapted for coupling to a processor-based system;
  a communication hub adapted for information communication with said first node and said second node, said hub comprising:
    a plurality of antenna elements, each antenna element of said plurality of antenna elements adapted for receiving radio frequency communication in the extremely high frequency spectrum, each antenna element of said plurality of antenna elements having a hub communication module coupled thereto;
    a third radio frequency modem, said third modem switchably coupled to at least one module of said plurality of antenna elements through a first switch, said third modem adapted to receive said communication from said hub module; and
    a third controller unit including a processor coupled to a third electronic memory and said switch, said processor also being coupled to said third modem;
  wherein each of said first, second, and third modems is adapted to communicate information at various predetermined information densities, and wherein each of said first, second, and third modems are dynamically configurable to select ones of said various predetermined information densities.

75. The system of claim 74, wherein said hub comprises a plurality of radio frequency modems, each modem of said plurality being switchably coupled to at least one module of said plurality of antenna elements through a switch.

76. The system of claim 75, wherein said hub is further adapted for coupling to an information communication backbone.

77. The system of claim 76, wherein said communication backbone provides information communication between a plurality of hubs, each hub of said plurality of hubs disposed to provide information communication within a substantially non-overlapping predetermined area.

78. The system of claim 74, wherein said extremely high frequency spectrum is a band of approximately 1.4 GHz at approximately 38 GHz.

79. The system of claim 74, wherein said hub communication module is adapted for converting said received extremely high frequency to a first intermediate frequency and said first communication module is further adapted for converting said first intermediate frequency to a second intermediate frequency.

80. The system of claim 79, wherein said first intermediate frequency is approximately 3 GHz.

81. The system of claim 79, wherein said second intermediate frequency is approximately 400 to 500 MHZ.

82. The system of claim 74, wherein said antenna comprises a parabolic dish providing approximately 42 dB of gain with a predetermined communication lobe of approximately 2 degrees.

83. The system of claim 74, wherein ones of said plurality of antenna elements comprises a hybrid mode lens corrected horn providing approximately 32 dB of gain with a predetermined communication lobe of approximately 16 degrees.

84. The system of claim 74, wherein said first switch is controlled by said processor according to a regimen stored in said second electronic memory.

85. The system of claim 74, wherein said hub further comprises an initialization algorithm stored in said third electronic memory, said initialization algorithm causing said hub to communicate with ones of said first and second node, said initialization algorithm further causing attributes of said communication with ones of said first and second node to be stored in said third electronic memory.

86. The system of claim 85, wherein said first controller unit of said first node controls information communication between said first node and said hub at least in part according to said regimen and said communication attributes stored in said second electronic memory.

* * * * *

US006016313C1

(12) EX PARTE REEXAMINATION CERTIFICATE (4913th)
United States Patent
Foster, Jr. et al.

(10) Number: US 6,016,313 C1
(45) Certificate Issued: Feb. 24, 2004

(54) SYSTEM AND METHOD FOR BROADBAND MILLIMETER WAVE DATA COMMUNICATION

(75) Inventors: Robert B. Foster, Jr., Bellevue, WA (US); Charles R. Baugh, Bellevue, WA (US); David C. Schafer, Bellevue, WA (US)

(73) Assignee: Wavtrace, Inc., Bellevue, WA (US)

Reexamination Request:
No. 90/005,726, May 15, 2000
No. 90/005,974, Apr. 5, 2001

Reexamination Certificate for:
Patent No.: 6,016,313
Issued: Jan. 18, 2000
Appl. No.: 08/740,332
Filed: Nov. 7, 1996

(51) Int. Cl.[7] .................................................. H04J 4/00
(52) U.S. Cl. ...................... 370/330; 370/337; 370/338; 455/562.1
(58) Field of Search ................................ 370/310, 328, 370/329, 336, 337, 338, 345, 347, 315, 319, 321, 323, 325, 326, 330, 343; 415/277.1, 277.2, 272, 278.1, 65, 63, 62, 501, 557, 562

(56) References Cited

U.S. PATENT DOCUMENTS

| 3,949,404 | A |   | 4/1976  | Fletcher et al. |
| 5,420,851 | A |   | 5/1995  | Seshadri et al. ............... 370/29 |
| 5,444,698 | A |   | 8/1995  | Kito |
| 5,594,720 | A |   | 1/1997  | Papadopoulos et al. ...... 370/201 |
| 5,768,254 | A |   | 6/1998  | Papadopoulos et al. ...... 370/330 |
| 5,809,431 | A |   | 9/1998  | Bustamante et al. ......... 455/562 |
| 5,828,695 | A | * | 10/1998 | Webb .......................... 375/219 |
| 5,859,619 | A |   | 1/1999  | Wu et al. |
| 5,890,055 | A | * | 3/1999  | Chu et al. ...................... 455/16 |
| 5,951,709 | A |   | 9/1999  | Tanaka |
| 6,006,069 | A | * | 12/1999 | Langston ...................... 455/62 |
| 6,094,421 | A |   | 7/2000  | Scott |
| 6,112,080 | A |   | 8/2000  | Anderson et al. |

* cited by examiner

Primary Examiner—Wellington Chin

(57) ABSTRACT

A system and method for information communication between physically separated processor-based systems. Disclosed is a centralized communication array providing point to multipoint information communication between processor-based systems utilizing communication nodes. Such information communication may be between two processor-based systems, each utilizing communication nodes or may be between a processor-based system utilizing a communication node and a processor-based system coupled to the centralized communication array through a backbone.

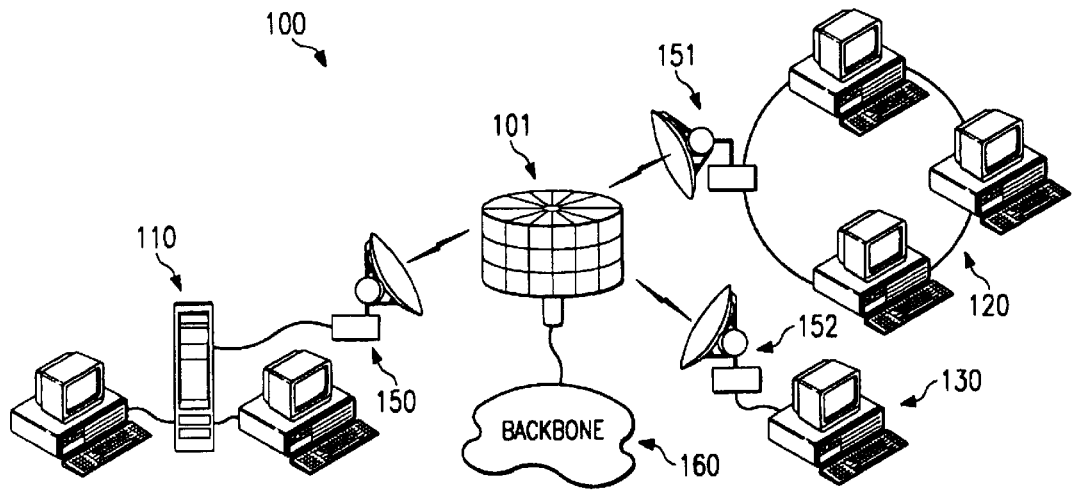

EX PARTE REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

The patentability of claims 44–64 and 70–73 is confirmed.

Claims 1–7, 25–31, 34, 37–43, 74, 78–81 and 84–86 are cancelled.

Claims 8, 32, 33, 35, 36, 65, 75, 82 and 83 are determined to be patentable as amended.

Claims 9–24, 66–69 and 76–77, dependent on an amended claim, are determined to be patentable.

8. [The] *A* system [of claim 1,] *for providing broadband information communication between a plurality of locations, said system comprising:*
*a plurality of nodes, each node having associated therewith at least one node antenna adapted for broadband communication in a frequency band of the millimeter wave spectrum of frequencies, said at least one node antenna having a predetermined communication beam to provide directional communication, said plurality of nodes comprising:*
*a first node of said plurality of nodes adapted to communicate via at least a first frequency band of the millimeter wave spectrum of frequencies; and*
*a second node of said plurality of nodes adapted to communicate via at least a second frequency band of the millimeter wave spectrum of frequencies; and*
*a processor-based communication hub comprising:*
*a plurality of hub antennas, each hub antenna having a predetermined communication beam to provide directional communication;*
*a first hub antenna of said plurality of antennas adapted to communicate with said first node via said first frequency band of the millimeter wave spectrum of frequencies; and*
*a second hub antenna of said plurality of antennas adapted to communicate with said second node via said second frequency band of the millimeter wave spectrum of frequencies;*
wherein at least one of said plurality of hub antennas is switchably connected to an internal signal provided within said hub.

32. [The] *A* system [of claim 31,] *for providing broadband information communication between a plurality of locations, said system comprising:*
*a plurality of nodes, each node having associated therewith at least one node antenna adapted for broadband communication in a frequency band of the millimeter wave spectrum of frequencies, said at least one node antenna having a predetermined communication beam to provide directional communication, said plurality of nodes comprising:*
*a first node of said plurality of nodes adapted to communicate via at least a first frequency band of the millimeter wave spectrum of frequencies; and*
*a second node of said plurality of nodes adapted to communicate via at least a second frequency band of the millimeter wave spectrum of frequencies; and*
*a processor-based communication hub comprising:*
*a plurality of hub antennas, each hub antenna having a predetermined communication beam to provide directional communication;*
*a first hub antenna of said plurality of antennas adapted to communicate with said first node via said first frequency band of the millimeter wave spectrum of frequencies; and*
*a second hub antenna of said plurality of antennas adapted to communicate with said second node via said second frequency band of the millimeter wave spectrum of frequencies;*
wherein ones of said plurality of nodes further include a radio frequency modem, said modem being coupled to said node antenna;
wherein a signal from said modem is time divided to include a plurality of information bursts;
wherein said plurality of information bursts include forward channel information bursts and reverse channel information bursts;
wherein said forward channel information bursts comprise a predetermined percentage of said plurality of information bursts and said reverse channel information bursts comprise the remaining percentage of said plurality of information bursts; and
wherein said forward and reverse channel information bursts are defined to comprise a percentage of said plurality of information bursts selected from the group consisting of:
approximately 94% forward channel information bursts and approximately 6% reverse channel information bursts; *and*
[approximately 50% forward channel information bursts and approximately 50% reverse channel information bursts; and]
approximately 6% forward channel information bursts and approximately 94% reverse channel information bursts.

33. [The] *A* system [of claim 31,] *for providing broadband information communication between a plurality of locations, said system comprising:*
*a plurality of nodes, each node having associated therewith at least one node antenna adapted for broadband communication in a frequency band of the millimeter wave spectrum of frequencies, said at least one node antenna having a predetermined communication beam to provide directional communication, said plurality of nodes comprising:*
*a first node of said plurality of nodes adapted to communicate via at least a first frequency band of the millimeter wave spectrum of frequencies; and*
*a second node of said plurality of nodes adapted to communicate via at least a second frequency band of the millimeter wave spectrum of frequencies; and*
*a processor-based communication hub comprising:*
*a plurality of hub antennas, each hub antenna having a predetermined communication beam to provide directional communication;* a first hub antenna of said plurality of antennas adapted to communicate with said first node via said first frequency band of the millimeter wave spectrum of frequencies; and a second hub antenna of said plurality of antennas adapted to communicate with said second node via said second frequency band of the millimeter wave spectrum of frequencies;

wherein ones of said plurality of nodes further include a radio frequency modem, said modem being coupled to said node antenna;

wherein a signal from said modem is time divided to include a plurality of information bursts;

wherein said plurality of information bursts include forward channel information bursts and reverse channel information bursts;

wherein said forward channel information bursts comprise a predetermined percentage of said plurality of information bursts and said reverse channel information bursts comprise the remaining percentage of said plurality of information bursts; and wherein said predetermined percentage is dynamically adjustable.

35. [The] *A* system [of claim 1,] *for providing broadband information communication between a plurality of locations, said system comprising:*

*a plurality of nodes, each node having associated therewith at least one node antenna adapted for broadband communication in a frequency band of the millimeter wave spectrum of frequencies, said at least one node antenna having a predetermined communication beam to provide directional communication, said plurality of nodes comprising:*

*a first node of said plurality of nodes adapted to communicate via at least a first frequency band of the millimeter wave spectrum of frequencies; and*

*a second node of said plurality of nodes adapted to communicate via at least a second frequency band of the millimeter wave spectrum of frequencies; and*

*a processor-based communication hub comprising:*

*a plurality of hub antennas, each hub antenna having a predetermined communication beam to provide directional communication;*

*a first hub antenna of said plurality of antennas adapted to communicate with said first node via said first frequency band of the millimeter wave spectrum of frequencies; and*

*a second hub antenna of said plurality of antennas adapted to communicate with said second node via said second frquency band of the millimeter wave spectrum of frequencies;* wherein ones of said plurality of hub antennas comprise a hybrid mode lens corrected horn providing approximately 32 dB of gain with a predetermined communication lobe of approximately 16 degrees, operating within 10 to 60 GHz.

36. [The] *A* system [of claim 1,] *for providing broadband information communication between a plurality of locations, said system comprising:*

*a plurality of nodes, each node having associated therewith at least one node antenna adapted for broadband communication in a frequency band of the millimeter wave spectrum of frequencies, said at least one node antenna having a predetermined communication beam to provide directional communication, said plurality of nodes comprising:*

*a first node of said plurality of nodes adapted to communicate via at least a first frequency band of the millimeter wave spectrum of frequencies; and*

*a second node of said plurality of nodes adapted to communicate via at least a second frequency band of the millimeter wave spectrum of frequencies; and*

*a processor-based communication hub comprising:*

*a plurality of hub antennas, each hub antenna having a predetermined communication beam to provide directional communication;*

*a first hub antenna of said plurality of antennas adapted to communicate with said first node via said first frequency band of the millimeter wave spectrum of frequencies; and*

*a second hub antenna of said plurality of antennas adapted to communicate with said second node via said second frequency band of the millimeter wave spectrum of frequencies;* wherein ones of said plurality of nodes include an antenna comprising a parabolic dish providing approximately 42 dB of gain with a predetermined communication lobe of approximately 2 degrees, operating within 10 to 60 GHz.

65. A system for providing broadband information communication between a plurality of locations, said system comprising:

a plurality of nodes, each node having associated therewith at least one node antenna adapted for broadband communication in a frequency band of the millimeter wave spectrum of frequencies, said at least one node antenna having a predetermined communication beam to provide directional communication, said plurality of nodes comprising:

a first node of said plurality of nodes adapted to communicate via at least a first frequency band of the millimeter wave spectrum of frequencies; and a second node of said plurality of nodes adapted to communicate via at least a second frequency band of the millimeter wave spectrum of frequencies; and a processor-based communication hub comprising:

a plurality of hub antennas, each hub antenna having a predetermined communication beam to provide directional communication, wherein at least one of said plurality of hub antennas is switchably connected to an internal signal provided within said hub, wherein said internal signal is time divided to include a plurality of information bursts, wherein said plurality of information bursts include [at least a] forward channel [set of] information bursts and [a] reverse channel [set of] information bursts, wherein said forward channel [set of] *information* bursts and said reverse channel [set of] *information* bursts are dynamically configurable;

a first hub antenna of said plurality of antennas adapted to communicate with said first node via said first frequency band of the millimeter wave spectrum of frequencies; and a second hub antenna of said plurality of antennas adapted to communicate with said second node via said second frequency band of the millimeter wave spectrum of frequencies.

75. [The] *A* system [of claim 74,] *for providing broadband information communication between a plurality of processor-based systems, said system comprising:*

*a first communication node coupled to a first processor-based system, said first node comprising:*

*a communication unit including an antenna, a first radio frequency modem, and a first communication module coupled there between, said antenna adapted for receiving radio frequency communication in the extremely high frequency spectrum; and* a first controller unit including a processor coupled to a first electronic memory and an interface, said processor also being coupled to said first modem, said interface being adapted for coupling to a processor-based system;

a second communication node coupled to a second processor-based system, said second node comprising:
a communication unit including an antenna, a second radio frequency modem, and a second communication module coupled there between, said antenna adapted for receiving radio frequency communication in the extremely high frequency spectrum; and
a second controller unit including a processor coupled to a second electronic memory and an interface, said processor also being coupled to said second modem, said interface being adapted for coupling to a processor-based system;

a communication hub adapted for information communication with said first node and said second node, said hub comprising:
a plurality of antenna elements, each antenna element of said plurality of antenna elements adapted for receiving radio frequency communication in the extremely high frequency spectrum, each antenna element of said plurality of antenna elements having a hub communication module coupled thereto;
a third radio frequency modem, said third modem switchably coupled to at least one module of said plurality of antenna elements through a first switch, said third modem adapted to receive said communication from said hub module; and
a third controller unit including a processor coupled to a third electronic memory and said switch, said processor also being coupled to said third modem;

wherein each of said first, second, and third modems is adapted to communicate information at various predetermined information densities, and wherein each of said first, second, and third modems are dynamically configurable to select ones of said various predetermined information densities; and wherein said hub comprises a plurality of radio frequency modems, each modem of said plurality being switchably coupled to at least one module of said plurality of antenna elements through a switch.

82. [The] *A* system [of claim 74,] *for providing broadband information communication between a plurality of processor-based systems, said system comprising:*

*a first communication node coupled to a first processor-based system, said first node comprising:*
*a communication unit including an antenna, a first radio frequency modem, and a first communication module coupled there between, said antenna adapted for receiving radio frequency communication in the extremely high frequency spectrum; and*
*a first controller unit including a processor coupled to a first electronic memory and an interface, said processor also being coupled to said first modem, said interface being adapted for coupling to a processor-based system;*

*a second communication node coupled to a second processor-based system, said second node comprising:*
*a communication unit including an antenna, a second radio frequency modem, and a second communication module coupled there between, said antenna adapted for receiving radio frequency communication in the extremely high frequency spectrum; and*

*a second controller unit including a processor coupled to a second electronic memory and an interface, said processor also being coupled to said second modem, said interface being adapted for coupling to a processor-based system;*

*a communication hub adapted for information communication with said first node and said second node, said hub comprising:*
*a plurality of antenna elements, each antenna element of said plurality of antenna elements adapted for receiving radio frequency communication in the extremely high frequency spectrum, each antenna element of said plurality of antenna elements having a hub communication module coupled thereto;*
*a third radio frequency modem, said third modem switchably coupled to at least one module of said plurality of antenna elements through a first switch, said third modem adapted to receive said communication from said hub module; and*
*a third controller unit including a processor coupled to a third electronic memory and said switch, said processor also being coupled to said third modem;*

*wherein each of said first, second, and third modems is adapted to communicate information at various predetermined information densities, and wherein each of said first, second, and third modems are dynamically configurable to select ones of said various predetermined information densities; and* wherein said antenna comprises a parabolic dish providing approximately 42 dB of gain with a predetermined communication lobe of approximately 2 degrees.

83. [The] *A* system [of claim 74,] *for providing broadband information communication between a plurality of processor-based systems, said system comprising:*

*a first communication node coupled to a first processor-based system, said first node comprising:*
*a communication unit including an antenna, a first radio frequency modem, and a first communication module coupled there between, said antenna adapted for receiving radio frequency communication in the extremely high frequency spectrum; and*
*a first controller unit including a processor coupled to a first electronic memory and an interface, said processor also being coupled to said first modem, said interface being adapted for coupling to a processor-based system;*

*a second communication node coupled to a second processor-based system, said second node comprising:*
*a communication unit including an antenna, a second radio frequency modem, and a second communication module coupled there between, said antenna adapted for receiving radio frequency communication in the extremely high frequency spectrum; and*
*a second controller unit including a processor coupled to a second electronic memory and an interface, said processor also being coupled to said second modem, said interface being adapted for coupling to a processor-based system;*

*a communication hub adapted for information communication with said first node and said second node, said hub comprising:*
*a plurality of antenna elements, each antenna element of said plurality of antenna elements adapted for receiving radio frequency communication in the extremely high frequency spectrum, each antenna element of said plurality of antenna elements having a hub communication module coupled thereto;* a third radio frequency modem, said third modem switchably coupled to at least one module of said plurality of antenna elements through a first switch, said third modem adapted to receive said communication from said hub module; and a third controller unit including a processor coupled to a third electronic memory and said switch, said processor also being coupled to said third modem;

wherein each of said first, second, and third modems is adapted to communicate information at various predetermined information densities, and wherein each of said first, second, and third modems are dynamically configurable to select ones of said various predetermined information densities; and wherein ones of said plurality of antenna elements comprises a hybrid mode lens corrected horn providing approximately 32 dB of gain with a predetermined communication lobe of approximately 16 degrees.

* * * * *